US009769336B2

(12) United States Patent
Aritomi

(10) Patent No.: US 9,769,336 B2
(45) Date of Patent: Sep. 19, 2017

(54) INFORMATION PROCESSING SYSTEM, MOBILE TERMINAL, AND METHOD OF CONTROLLING THE SAME

(71) Applicant: CANON KABUSHIKI KAISHA, Tokyo (JP)

(72) Inventor: Masanori Aritomi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/090,757

(22) Filed: Apr. 5, 2016

(65) Prior Publication Data

US 2016/0301815 A1 Oct. 13, 2016

(30) Foreign Application Priority Data

Apr. 10, 2015 (JP) ................................. 2015-081228

(51) Int. Cl.
*H04N 1/00* (2006.01)
*H04N 1/04* (2006.01)
*H04W 4/00* (2009.01)
*H04W 4/02* (2009.01)

(52) U.S. Cl.
CPC ....... *H04N 1/00307* (2013.01); *H04N 1/0023* (2013.01); *H04N 1/00228* (2013.01); *H04N 1/00411* (2013.01); *H04N 1/04* (2013.01); *H04W 4/008* (2013.01); *H04N 2201/006* (2013.01); *H04N 2201/0039* (2013.01); *H04N 2201/0094* (2013.01); *H04W 4/023* (2013.01)

(58) Field of Classification Search
CPC .......... H04N 1/00307; H04N 1/00228; H04N 1/0023; H04N 1/00411; H04N 1/04; H04N 2201/0094; H04N 2201/0039; H04N 2201/006; H04W 4/008; H04W 4/023
USPC ........................................................ 358/1.15
See application file for complete search history.

(56) References Cited

U.S. PATENT DOCUMENTS

| 5,629,981 A * | 5/1997 | Nerlikar | G06K 7/0008 340/10.31 |
| 9,477,336 B2 * | 10/2016 | Kaigawa | G06F 3/0412 |
| 2003/0152231 A1 * | 8/2003 | Tomita | G07C 9/00103 380/258 |

(Continued)

FOREIGN PATENT DOCUMENTS

JP 2007310865 A 11/2007

*Primary Examiner* — Allen H Nguyen
(74) *Attorney, Agent, or Firm* — Rossi, Kimms & McDowell LLP

(57) ABSTRACT

In order to support a user operation in a system cooperation function using wireless communication, an information processing system includes an image processing apparatus with an image scanning unit and a mobile terminal. The mobile terminal performs wireless communication with the image processing apparatus; identifies a distance from the image processing apparatus based on the wireless communication; displays a screen used to accept a user operation; and controls an image scanning operation by the image scanning unit in cooperation with the image processing apparatus. If the distance is less than a predetermined distance, the mobile terminal displays a first screen that prompts a first scanning method, and if the distance is not less than the predetermined distance, the mobile terminal displays a second screen that prompts a second scanning method different from the first scanning method.

11 Claims, 28 Drawing Sheets

(56) References Cited

U.S. PATENT DOCUMENTS

| | | | |
|---|---|---|---|
| 2004/0246536 A1* | 12/2004 | Kim | H04N 1/00411 358/474 |
| 2007/0149124 A1* | 6/2007 | Onozawa | H04B 5/0062 455/41.2 |
| 2007/0249376 A1 | 10/2007 | Ogura et al. | |
| 2008/0192289 A1* | 8/2008 | Honda | G06F 21/608 358/1.15 |
| 2013/0329253 A1* | 12/2013 | Sasaki | H04N 1/0035 358/1.15 |
| 2014/0268225 A1* | 9/2014 | Shibukawa | H04N 1/00204 358/1.15 |

* cited by examiner

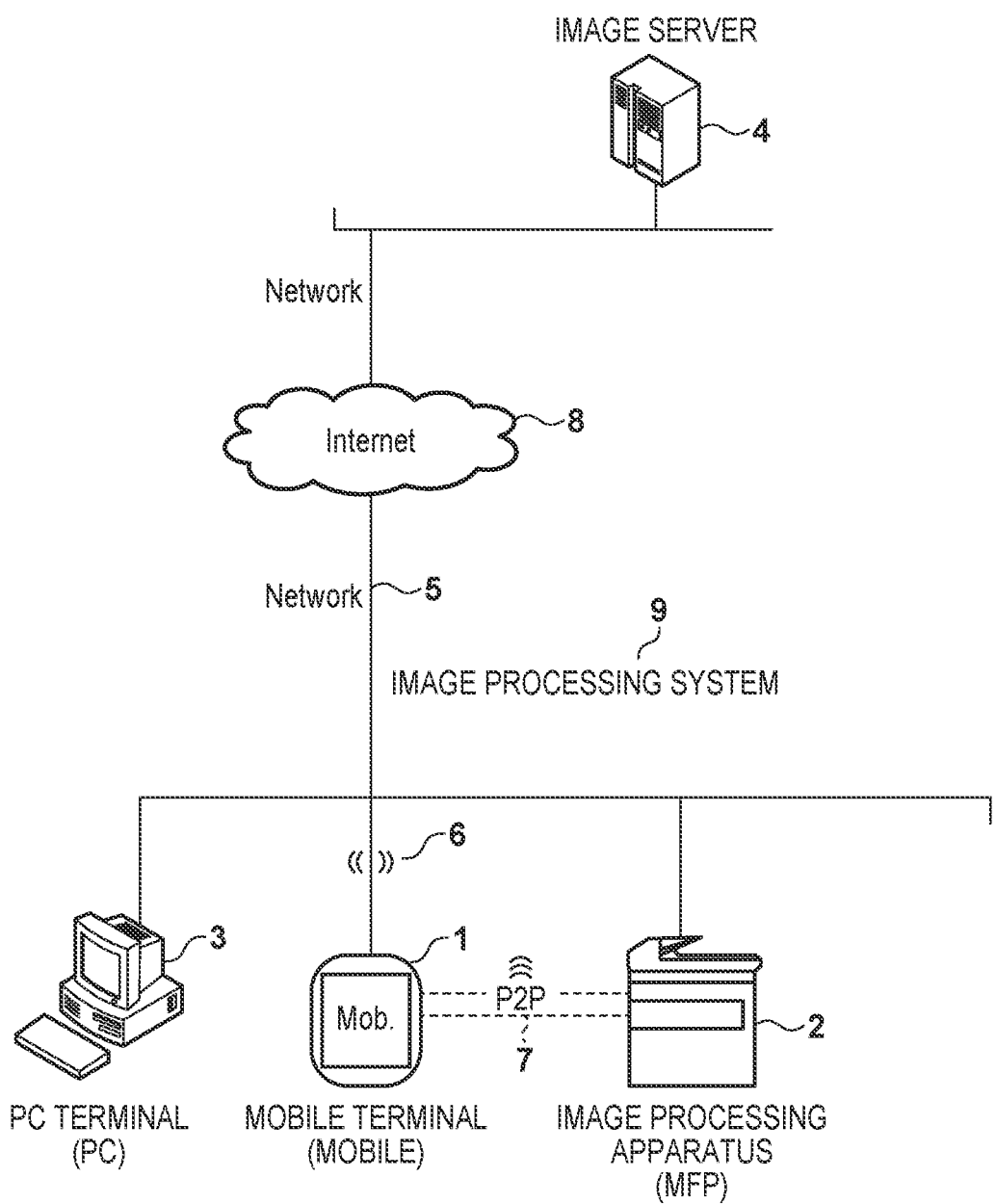

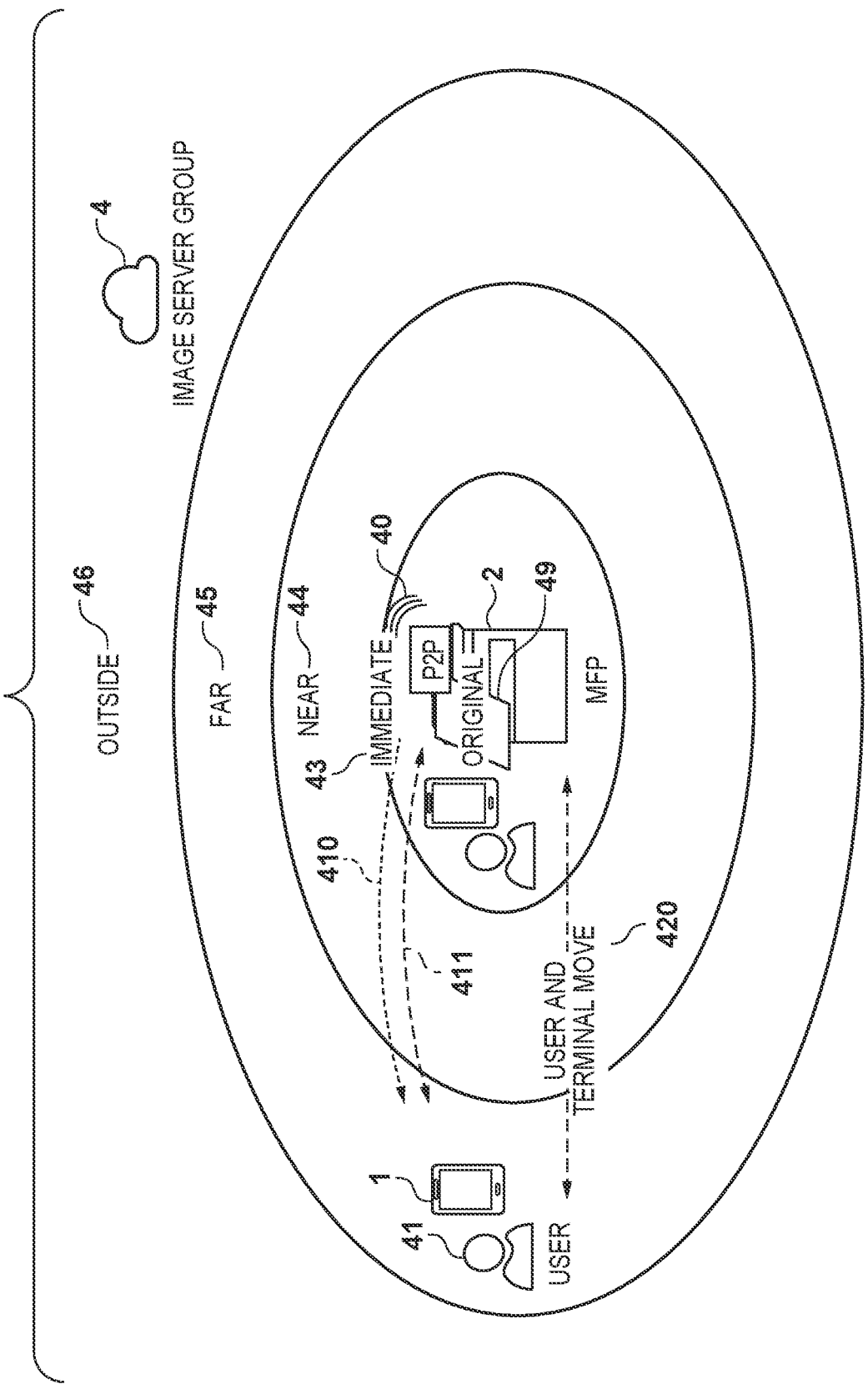

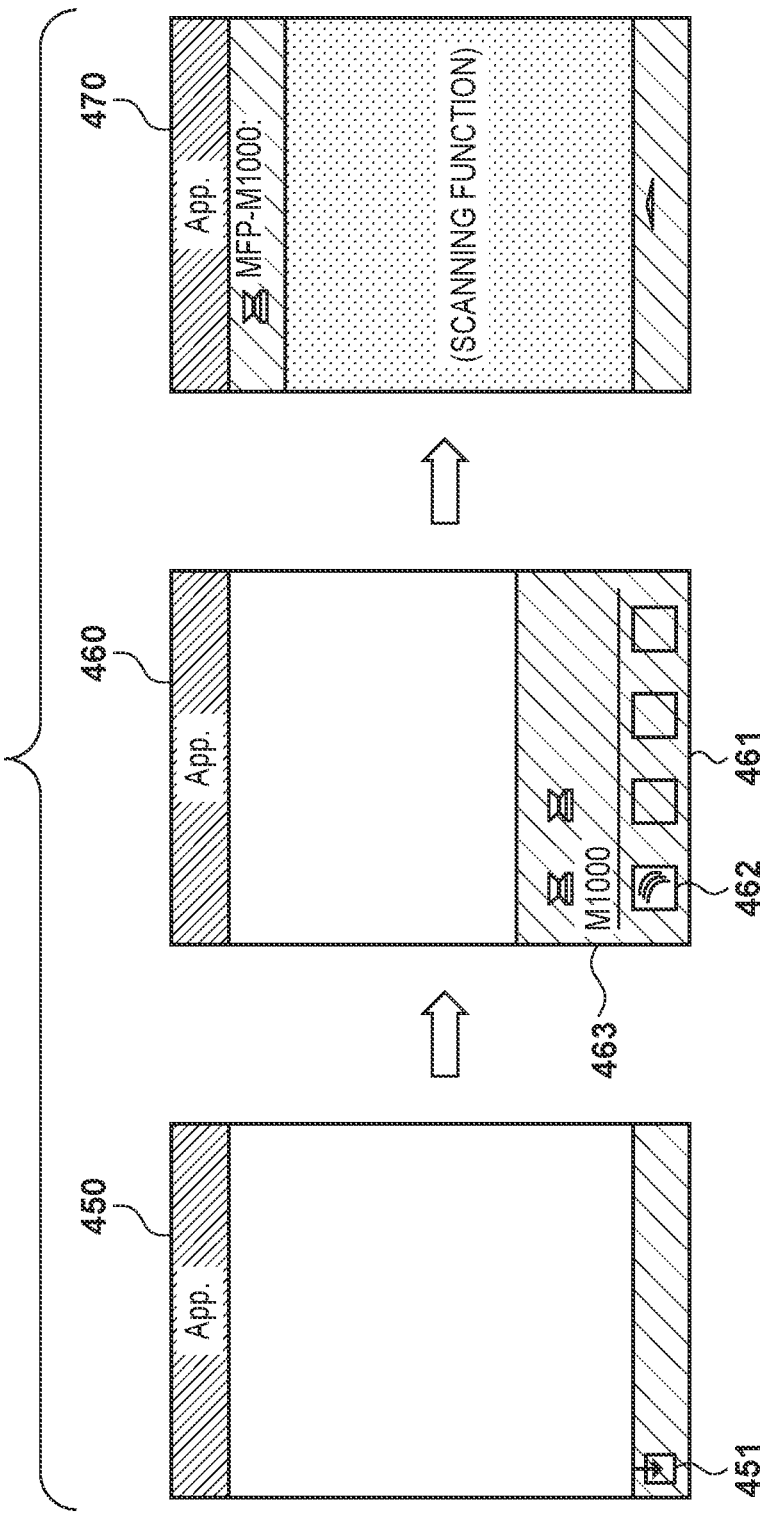

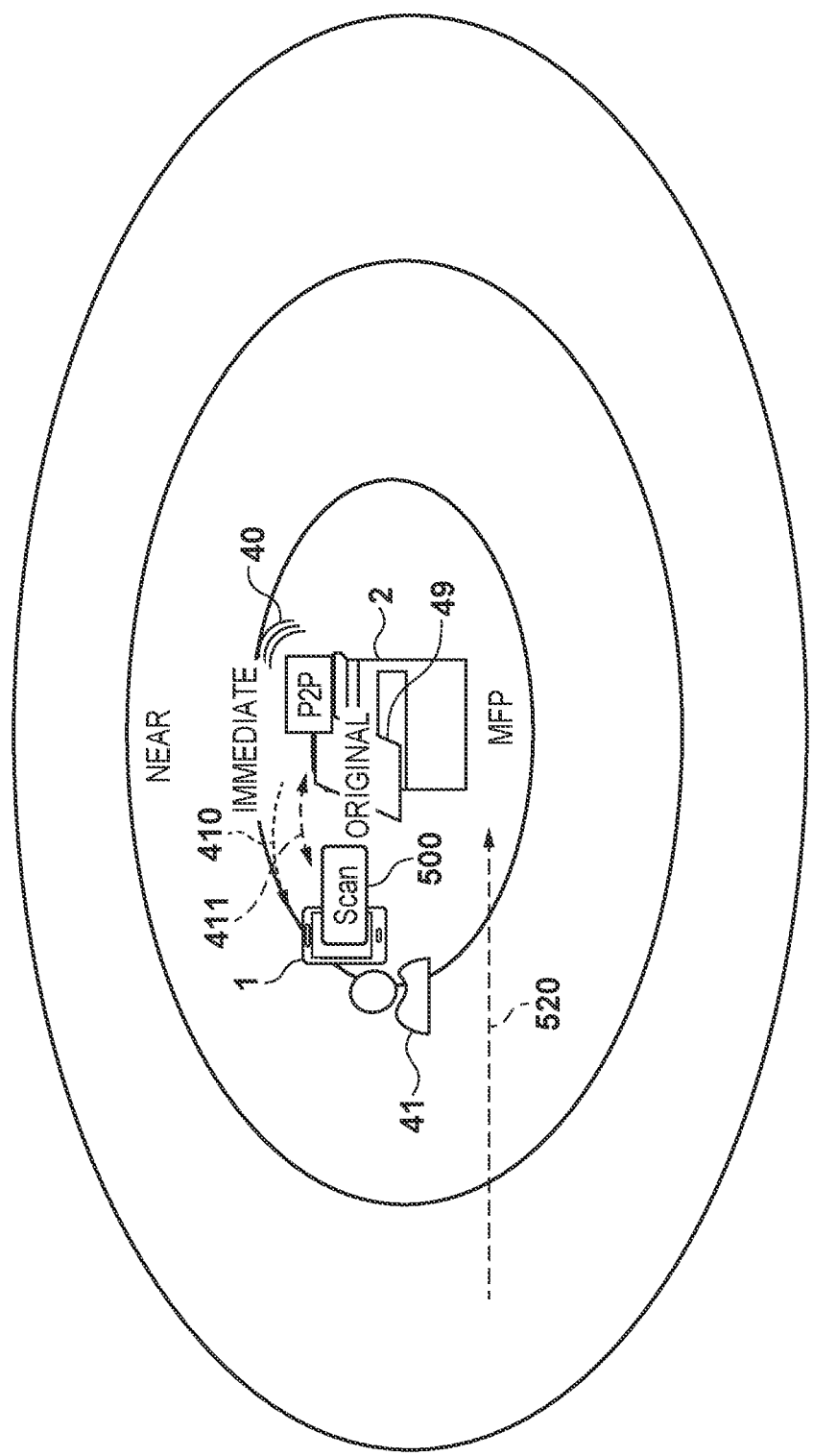

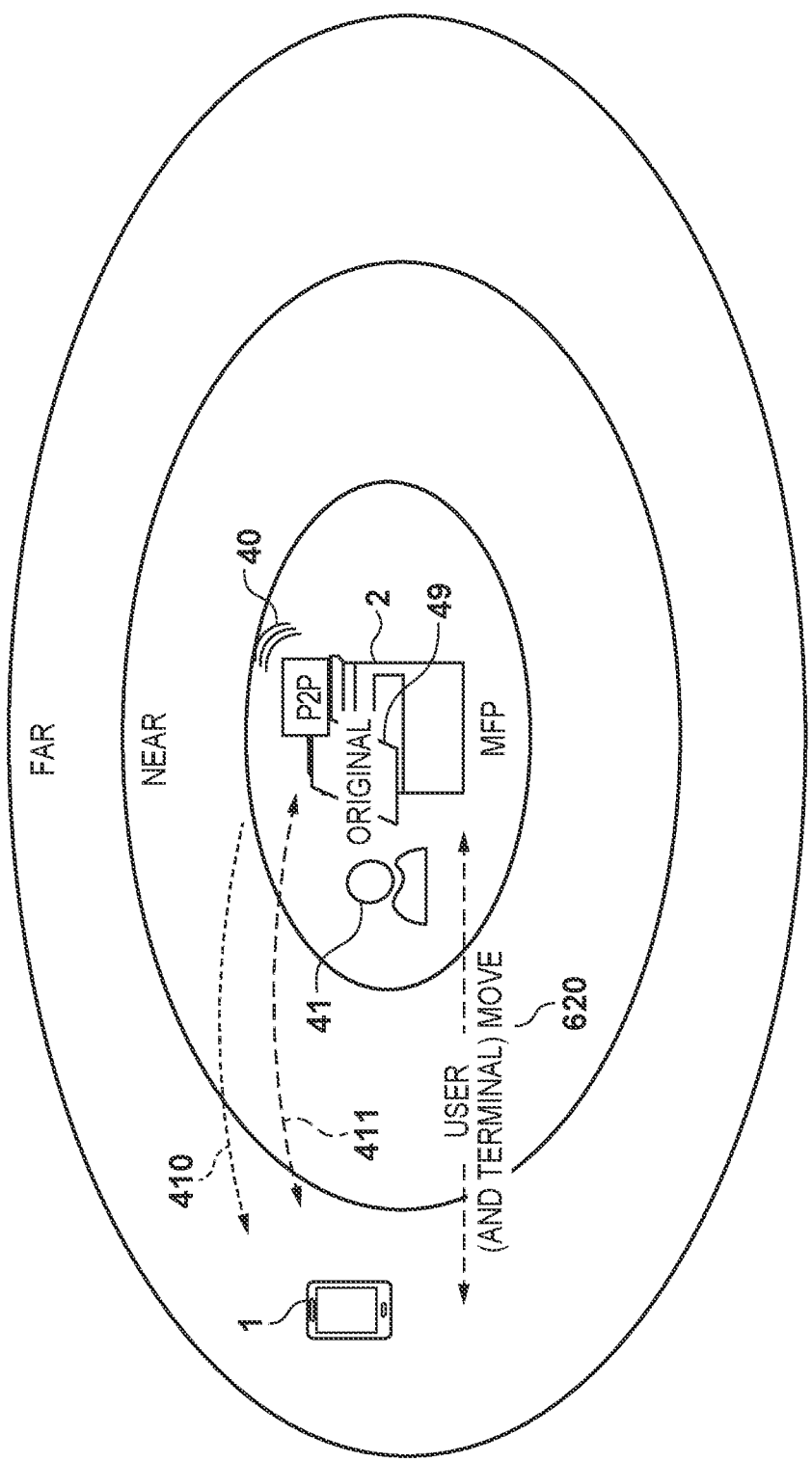

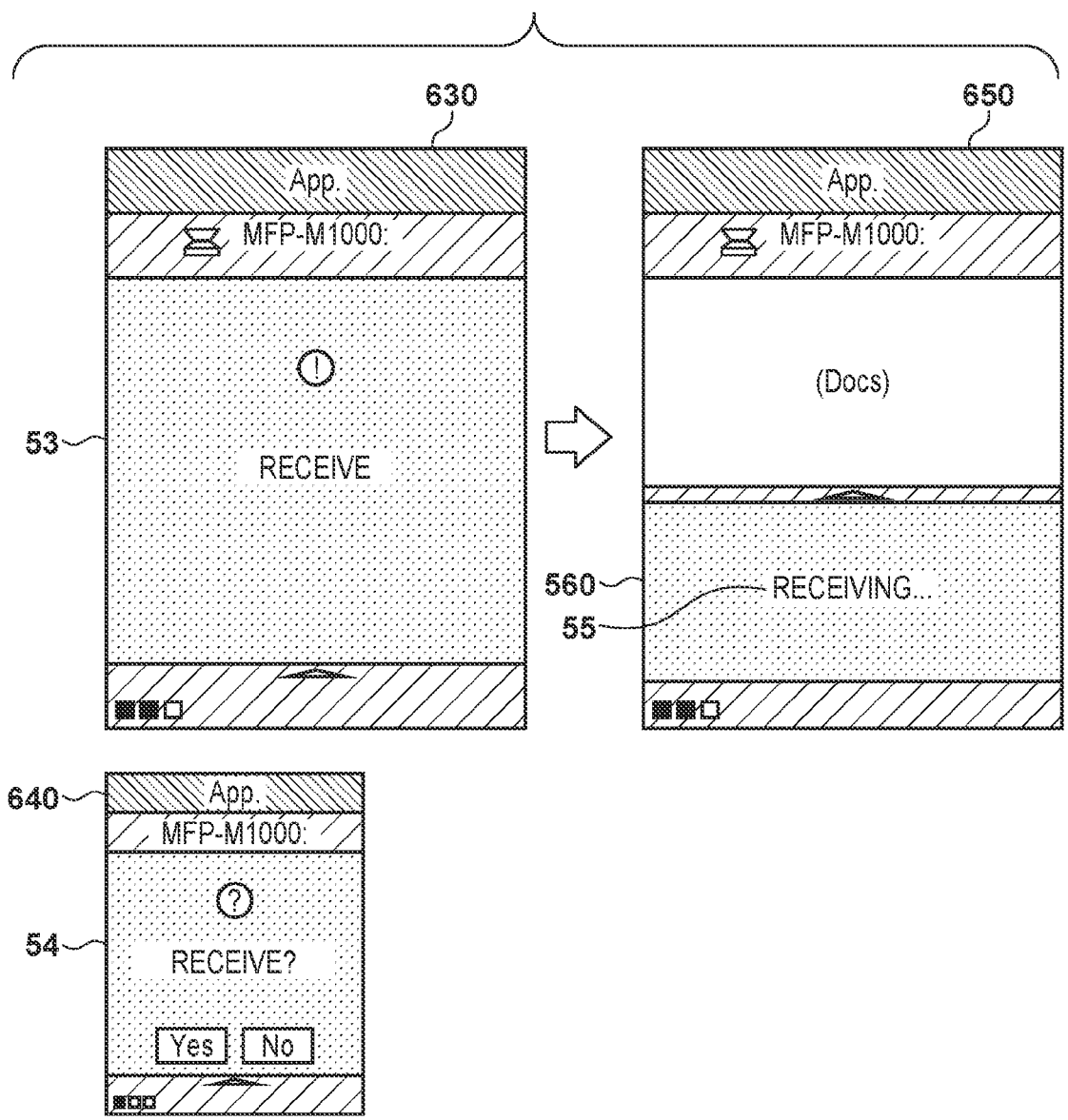

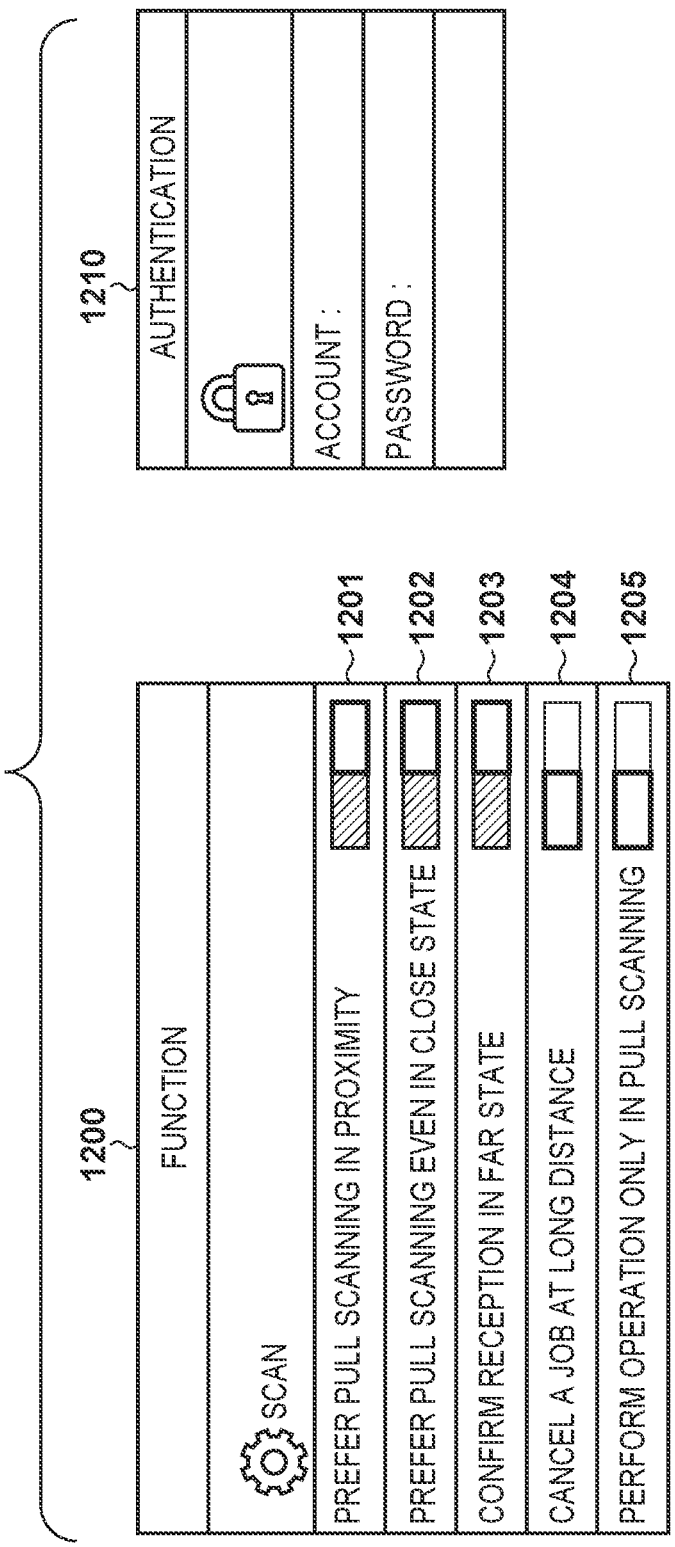

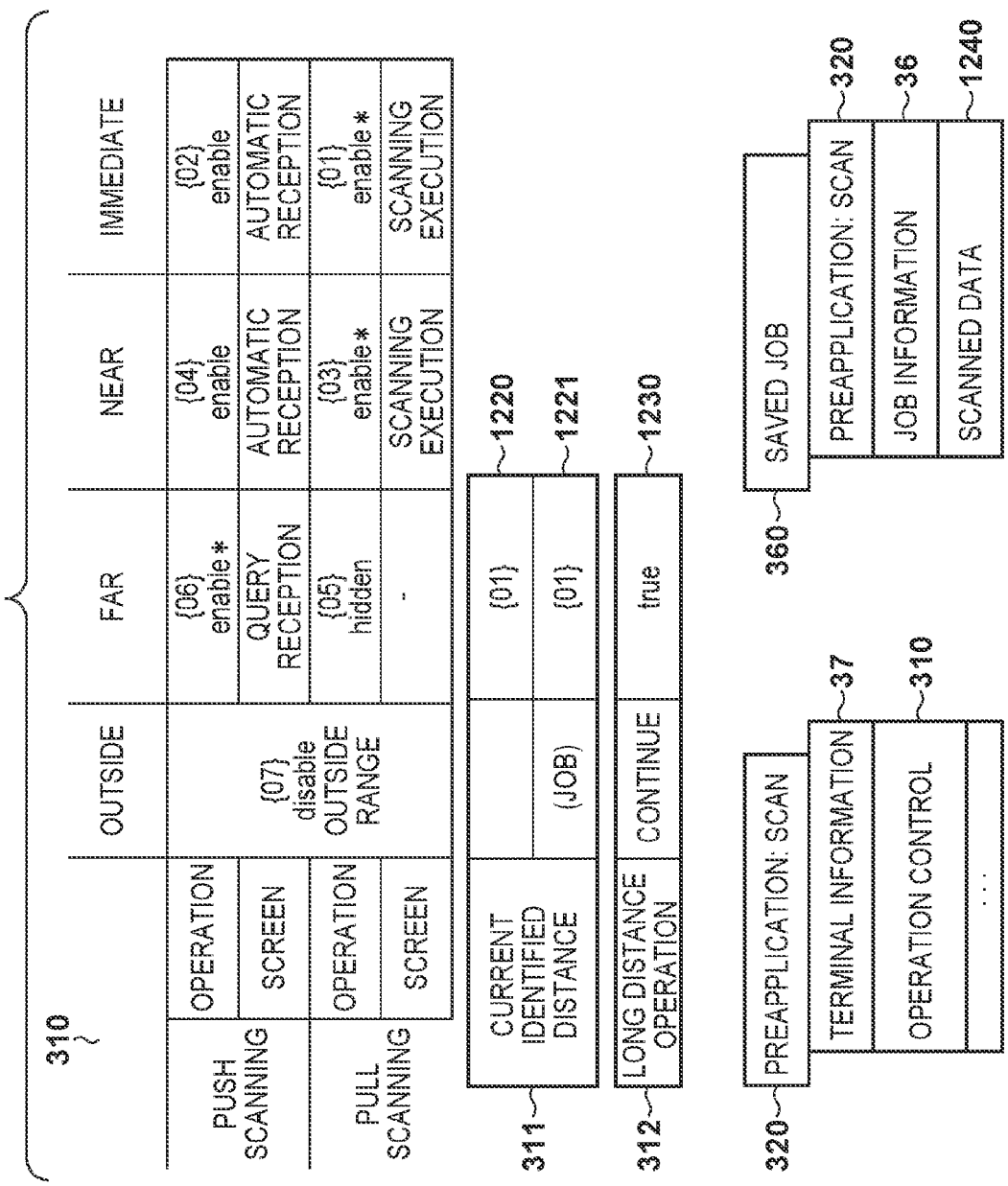

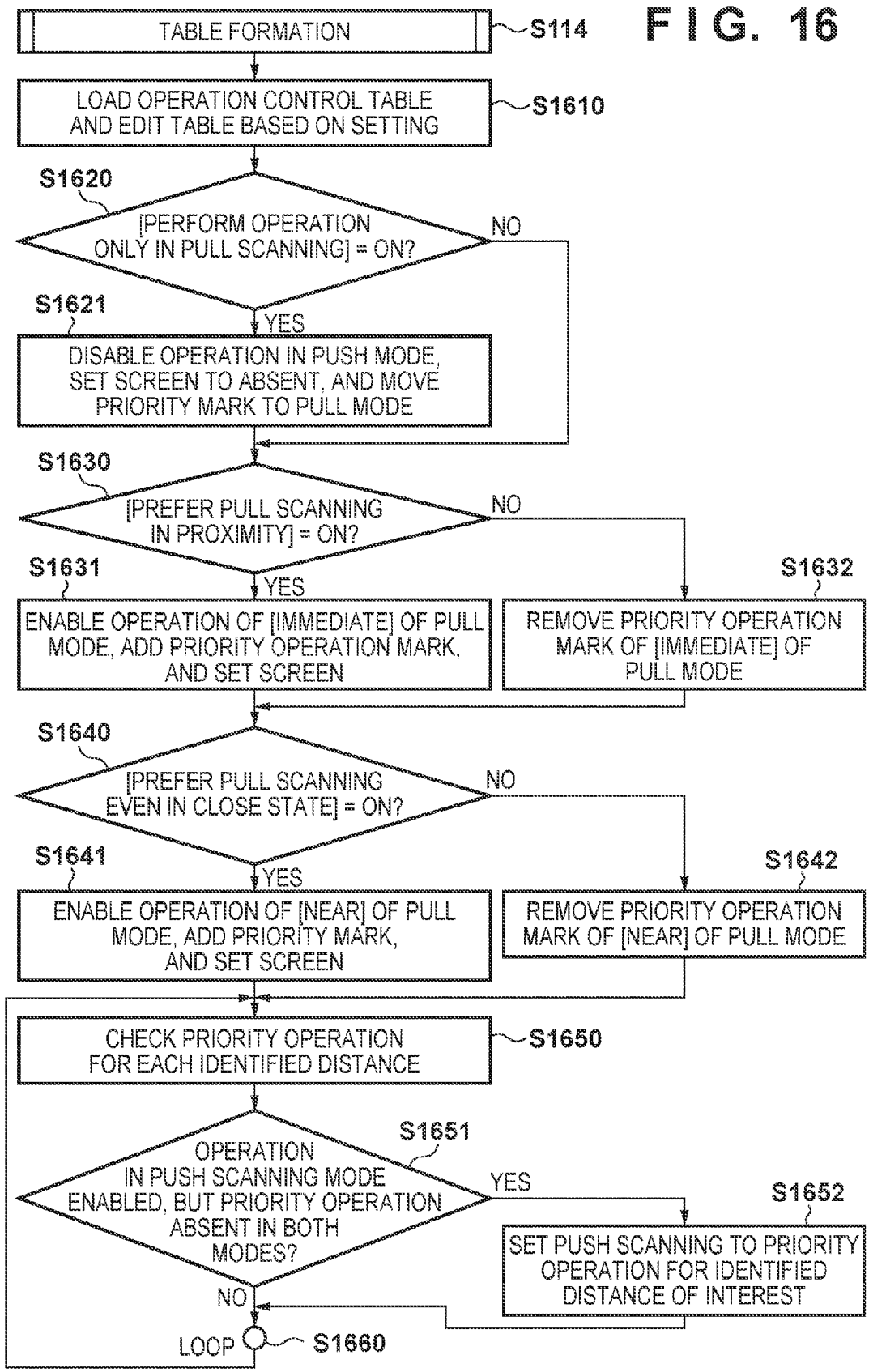

F I G. 17A
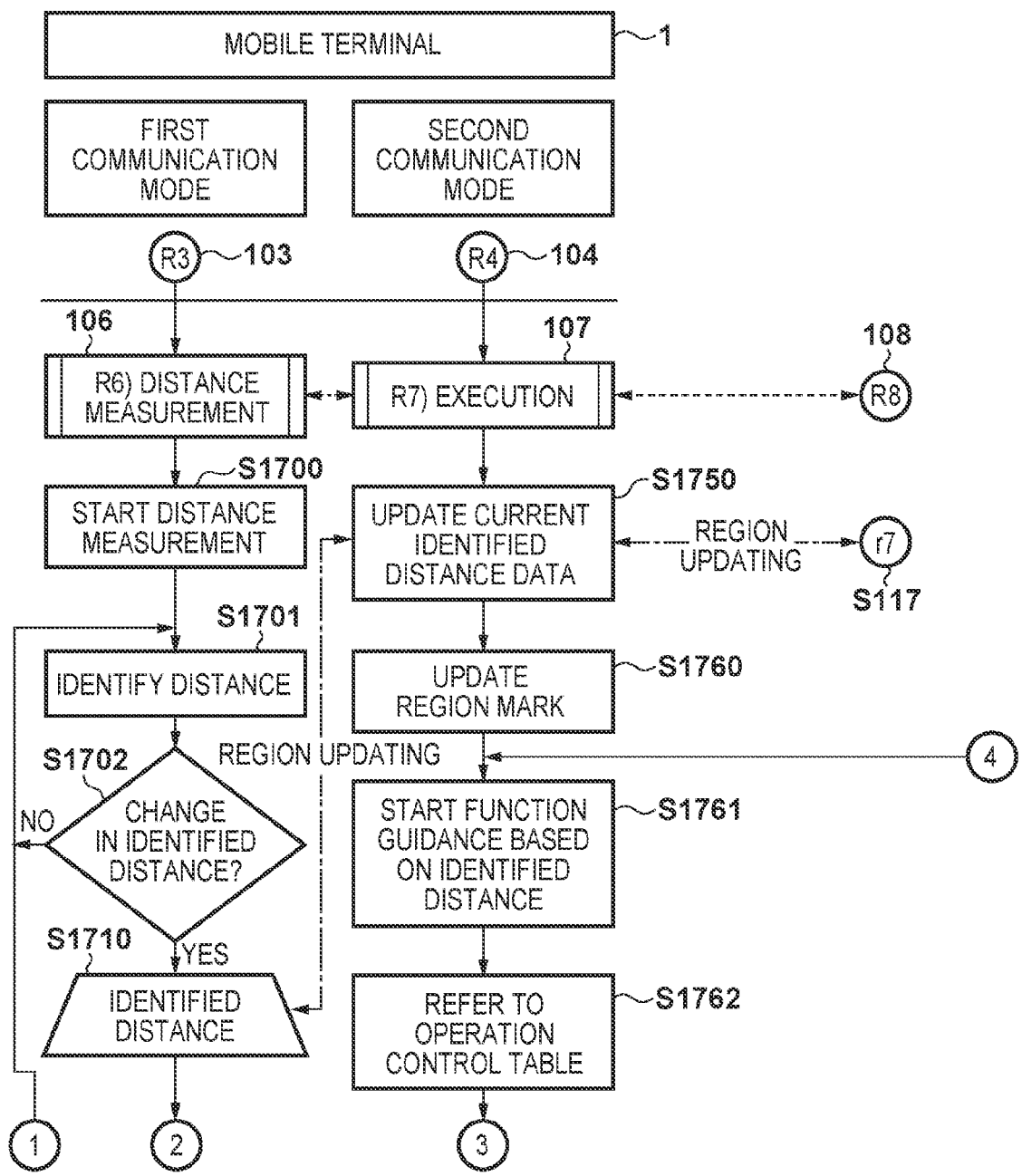

INFORMATION PROCESSING SYSTEM, MOBILE TERMINAL, AND METHOD OF CONTROLLING THE SAME

BACKGROUND OF THE INVENTION

Field of the Invention

The present invention relates to a technique of supporting a user operation in a system cooperation function using wireless communication.

Description of the Related Art

A technique of using an image processing apparatus (MFP) from a mobile terminal has received attention. In particular, a technique of causing a nearby MFP to do print output using the OS of a mobile terminal or an application provided by a device vendor has received attention. Additionally, the mobile terminal is equipped with short distance communication (Wi-Fi Direct®, Bluetooth®, NFC, or the like), and can be connected to a compatible device via the short distance communication and exchange data. Peer-to-peer communication can also be performed by the short distance communication between the mobile terminal and the MFP.

There has been developed a technology of specifying the position of a device or performing positioning and distance measurement using a technology (for example, BLE (Bluetooth® Low Energy)) capable of energy-saving long-distance communication out of these short distance communication technologies. For example, a transmitter BLE-broadcasts information including device information. A receiver receives the signal in a region, thereby specifying the transmitter and measuring the positional relationship. Such information transmission will be referred to as notification transmission, and the signal will be referred to as a notification signal hereinafter. There has also been developed a peer-to-peer connection technology that uses these short distance communication technologies, including the LE mode, together. iBeacon® is the mechanism of a position information service. When this mechanism is used, it is possible to provide a service in which a transmitter is placed in a store, and a customer's mobile terminal detects a signal from the transmitter and is thus notified of the information of store sales. For example, Japanese Patent Laid-Open No. 2007-310865 discloses a transmission control technique of causing an information processing apparatus to detect a portable terminal, acquire mail information, edit the mail information, and transmit email to the portable terminal.

Occasions to use a nearby MFP from a mobile terminal are expected to further grow, and a short distance communication technology between a mobile terminal and an MFP has also been developed.

However, when the above-described notification transmission technology is applied to a conventional image processing system, it is difficult for the user to know a device whose operation unit should be operated concerning system cooperation between the mobile terminal and the MFP. For example, it is hard for the user to know a device whose operation unit should be operated when using a system cooperation function such as a scanning function of the MFP.

SUMMARY OF THE INVENTION

According to one aspect of the present invention, an information processing system including an image processing apparatus with an image scanning unit and a mobile terminal, the mobile terminal comprises: a wireless communication unit configured to perform wireless communication with the image processing apparatus; a distance identification unit configured to identify a distance from the image processing apparatus based on the wireless communication by the wireless communication unit; a display unit configured to display a screen used to accept a user operation; and a control unit configured to control an image scanning operation by the image scanning unit in cooperation with the image processing apparatus, wherein if the distance identified by the distance identification unit is less than a predetermined distance, the display unit displays a first screen that prompts a first scanning method, and if the distance identified by the distance identification unit is not less than the predetermined distance, the display unit displays a second screen that prompts a second scanning method different from the first scanning method.

According to another aspect of the present invention, a mobile terminal that controls an image processing apparatus with an image scanning unit via wireless communication, comprises: a distance identification unit configured to identify a distance from the image processing apparatus based on the wireless communication with the image processing apparatus; a display unit configured to display a screen used to accept a user operation; and a control unit configured to control an image scanning operation by the image scanning unit in cooperation with the image processing apparatus, wherein if the distance identified by the distance identification unit is less than a predetermined distance, the display unit displays a first screen that prompts a first scanning method, and if the distance identified by the distance identification unit is not less than the predetermined distance, the display unit displays a second screen that prompts a second scanning method different from the first scanning method.

The present invention supports a user operation in a system cooperation function using wireless communication.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a view exemplarily showing the overall arrangement of an image processing system;

FIGS. 4A and 4B are views for explaining the distance between a mobile terminal and an MFP;

FIGS. 5A and 5B are views for explaining an operation when the mobile terminal and the MFP are close to each other;

FIGS. 6A and 6B are views for explaining an operation when the mobile terminal and the MFP are apart from each other;

FIGS. 12A and 12B are views showing examples of a setting screen, an authentication screen, and various kinds of data under management;

FIG. 16 is a flowchart showing details of table formation processing;

FIGS. 17A and 17B are flowcharts of processes (R6), (R7), and (R9) in the mobile terminal;

DESCRIPTION OF THE EMBODIMENTS

Figure 2A:
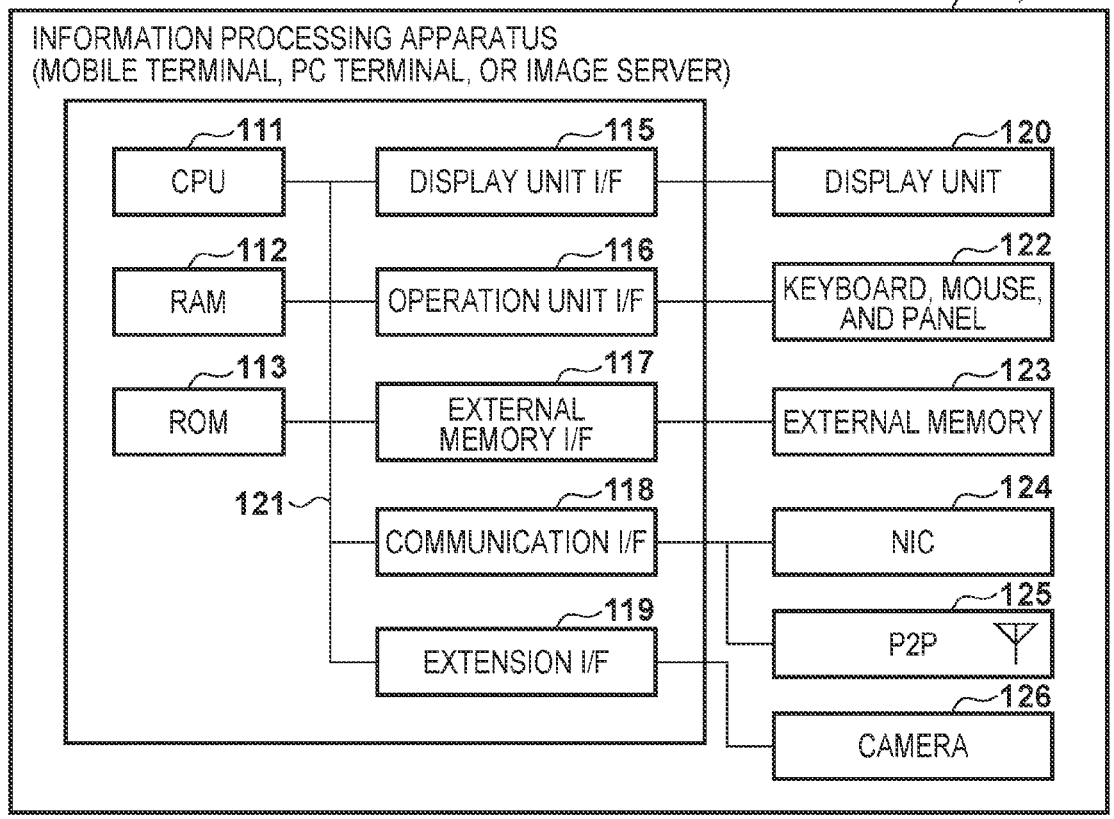
FIGS. 2A and 2B are block diagrams showing the hardware arrangements of devices.

Preferred embodiments of the present invention will now be described in detail with reference to the accompanying drawings. Note that the embodiments are merely examples, and the technical scope of the present invention is not limited by the following embodiments.

(First Embodiment)

As an information processing system according to the first embodiment of the present invention, an image processing system 9 including a mobile terminal 1 and an MFP 2 will be exemplified below.

<Prerequisite Technique>

BLE (Bluetooth® Low Energy) is an extended specification of Bluetooth®. In an LE mode, power-saving communication is possible. The LE mode is suitable for simple communication in a small amount. On the other hand, a normal mode consumes more power than the LE mode but enables faster data transmission/reception. A technique using both Bluetooth® and Wi-Fi or the like has also been developed. Since such extension and concurrent use of short distance communication technologies are done, wireless communications of various combinations can be used. Communication complying with the LE mode will be referred to as a first communication mode, and communication complying with the normal mode will be referred to as a second communication mode hereinafter.

In a form that connects an MFP and a PC, two forms "pull scanning" and "push scanning" are used as scanning functions. In both forms, the MFP and the PC cooperatively control an image scanning operation. Pull scanning is a form in which the user operates the PC, and the PC extracts a document from the MFP. On the other hand, push scanning is a form in which the user operates the MFP, and the MFP transmits a scanned document to a designated PC. Note that the pull scanning and push scanning respectively have advantages and are selectively used.

When using the scanning function, the user first moves to the front of the scanner to set an original. To operate an MFP operation unit, the user logs in to the MFP. The login is done in a case in which an authentication function for managing the MFP is enabled. The user performs an authentication operation for the MFP by inserting a card or inputting a PIN code.

Conventionally, pull scanning and push scanning are selectively used assuming fixed placement of both the MFP and the PC. For example, in an office environment, push scanning is mainly used, which is suitable for scanning from an MFP placed in an OA corner to a PC placed on each desk. The positions and connection relationship of system components such as the scanner, the operation unit, and an original in the MFP, a PC terminal and an operation unit thereof, and a user are assumed to be fixed.

However, when a mobile terminal is used, the user can move to the front of the MFP, taking an original and the mobile terminal with him/her, at the time of using the scanning function. That is, an event occurs in which the user can operate both the two operation units of the MFP and the mobile terminal. On the other hand, the user can also move without the mobile terminal. Although notification transmission reaches to a rather long distance, the user and the mobile terminal may move and leave the coverage. That is, the communication state between the MFP and the mobile terminal is not always maintained.

<Arrangement of Image Processing System>

FIG. 1 is a view exemplarily showing the overall arrangement of the image processing system 9 according to the first embodiment.

The image processing system 9 includes the mobile terminal 1 and the MFP 2. The image processing system 9 also includes at least one image server 4, like the mobile terminal 1. These devices are connected to via a network 5, and the network 5 is connected to the Internet 8. That is, the devices included in the image processing system 9 can communicate data to each other via the Internet 8.

For example, the mobile terminal 1 can select mobile communication 6 as a method of connecting the Internet 8. The mobile communication 6 includes wireless communication and public line communication. In addition, the mobile terminal 1 and the MFP 2 can perform P2P communication 7. The P2P communication 7 includes wireless communication, short distance communication (NFC or the like), and infrared communication. The mobile terminal 1 and the MFP 2 can be connected by the P2P communication 7 without going through of the Internet 8. The mobile terminal 1 and the MFP 2 may each include a plurality of devices. The servers included in the at least one image server 4 are connected via the network 5, and the network 5 is connected to the Internet 8.

<Hardware Arrangement>

Figure 2B:
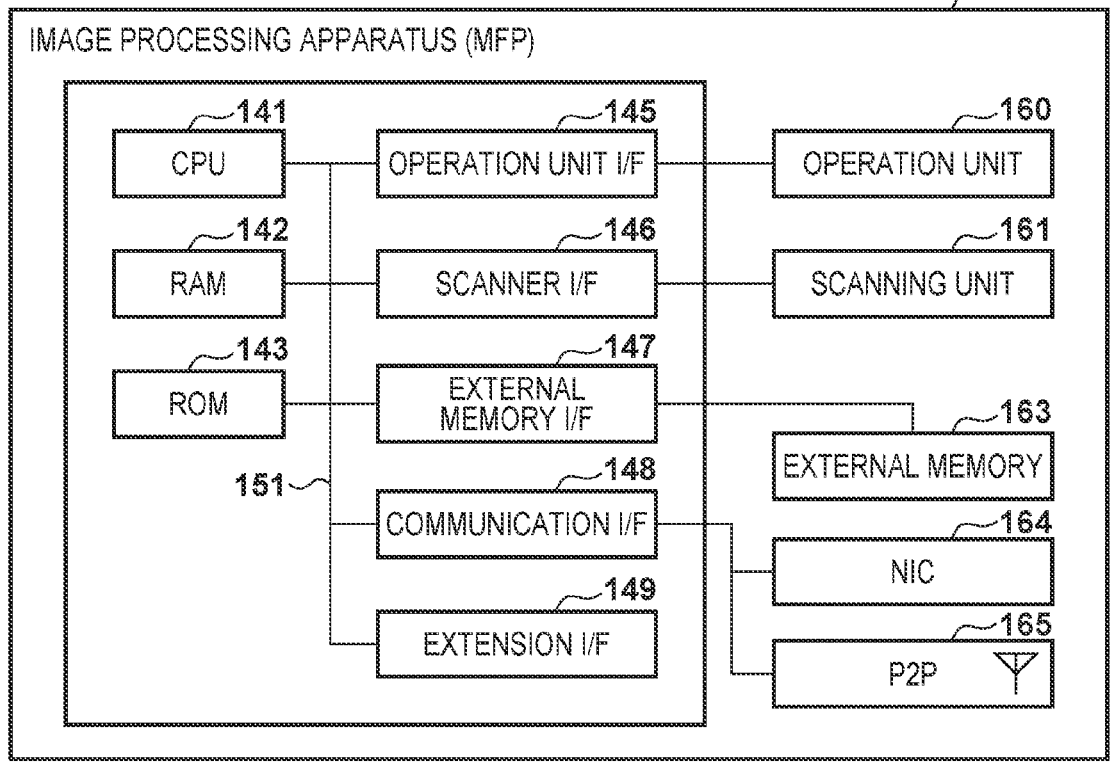

FIGS. 2A and 2B are block diagrams showing the hardware arrangements of the devices in the system. FIG. 2A is a block diagram showing an example of the hardware arrangement of an information processing apparatus (the mobile terminal, a PC terminal, or the image server). On the other hand, FIG. 2B is a block diagram showing an example of the hardware arrangement of the MFP.

A CPU 111 generally controls devices connected to a system bus 121 in accordance with programs stored in a ROM 113 that is a storage unit. A RAM 112 also functions as the main memory or work area of the CPU 111. The ROM 113 stores various kinds of programs and data. An operation unit I/F 116 controls input from a keyboard 122, a pointing device such as a mouse, or a touch panel. A display unit I/F 115 controls display on a display unit 120 that displays a screen to accept a user operation. An external memory I/F 117 controls access to an external memory 123, for example, an HDD, a flash memory, or an SSD (Solid State Drive).

The external memory 123 functions as a savable or readable storage medium, and stores the operating system (OS), a web browser, and applications. The programs of the applications and modules (software) are stored in the external memory 123. The programs are loaded to the RAM 112 and executed by the CPU 111 as needed. The functions of the applications and modules (software) are thus implemented.

A communication I/F 118 controls communication of an NIC 124 and P2P 125. The NIC 124 is a connection I/F to a network. The NIC 124 enables connection to a network and controls data transmission/reception. Note that the arrangement is not limited to that shown in FIG. 2A, and the NIC 124 may control communication to a portable network or the like and enable connection to a network to a base station. The P2P 125 is a connection I/F of P2P communication. The P2P 125 enables P2P connection and controls device connection or data transmission/reception.

Processing of the mobile terminal 1 to be described below is implemented when the programs recorded in the external memory 123 are loaded to the RAM 112 and executed by the CPU 111. Note that the programs may be stored not only in the external memory 123 but also in the RAM 112 or ROM 113.

A CPU 141 controls the overall operation of the MFP 2. The CPU 141 generally controls devices connected to a system bus 151 in accordance with programs stored in a ROM 143. A RAM 142 functions as the main memory or work area of the CPU 141, and also serves as an input information expansion area or environmental data storage area. The RAM 142 also includes an NVRAM (nonvolatile RAM), and is configured to expand the memory capacity by an optional RAM connected to an expansion port (not shown). The ROM 143 stores various kinds of fonts, control programs to be executed by the CPU 141, and various kinds of data.

A communication I/F 148 controls communication of an NIC 164 and P2P 165. The NIC 164 is a connection I/F to a network, and controls data transmission/reception to/from the image server 4, a PC terminal 3, and the mobile terminal 1. The P2P 165 is a connection I/F of P2P communication. The P2P 165 enables P2P connection and controls device connection or data transmission/reception. The communication I/F 148 includes an implementation suitable for an execution environment such as a web service protocol. A scanner I/F 146 controls an interface to a scanning unit 161 that is an image scanning unit (scanner engine). A printer engine (not shown) also has the same interface as the scanner engine.

Access to an external memory 163 is controlled by an external memory I/F 147. Examples of the external memory 163 are an HDD, a flash memory, and an SSD. The CPU 141 loads the programs stored in the external memory 163, the ROM, or the like to the RAM 142 and executes them as needed, thereby implementing the functions of the MFP 2. An operation unit I/F 145 controls an interface to an operation unit 160 that accepts user operations to do various settings of the MFP 2.

Processing of the MFP to be described below is implemented when the programs recorded in the external memory 163 are loaded to the RAM 142 and executed by the CPU 141. Note that the programs may be stored not only in the external memory 163 but also in the RAM 142 or ROM 143.

In the following explanation, the P2Ps 125 and 165 are assumed to do communication complying with the Bluetooth communication standard. Especially, in the following description, the P2P 125 is assumed to detect a notification signal (for example, a beacon) transmitted by the P2P 165 and thus start P2P communication. It is also assumed that wireless communication in the LE (Low Energy) mode is used in distance measurement, and wireless communication in the normal mode is used to, for example, transfer a scanned image.

<Software Configurations and Examples of Data>

Figure 3A:
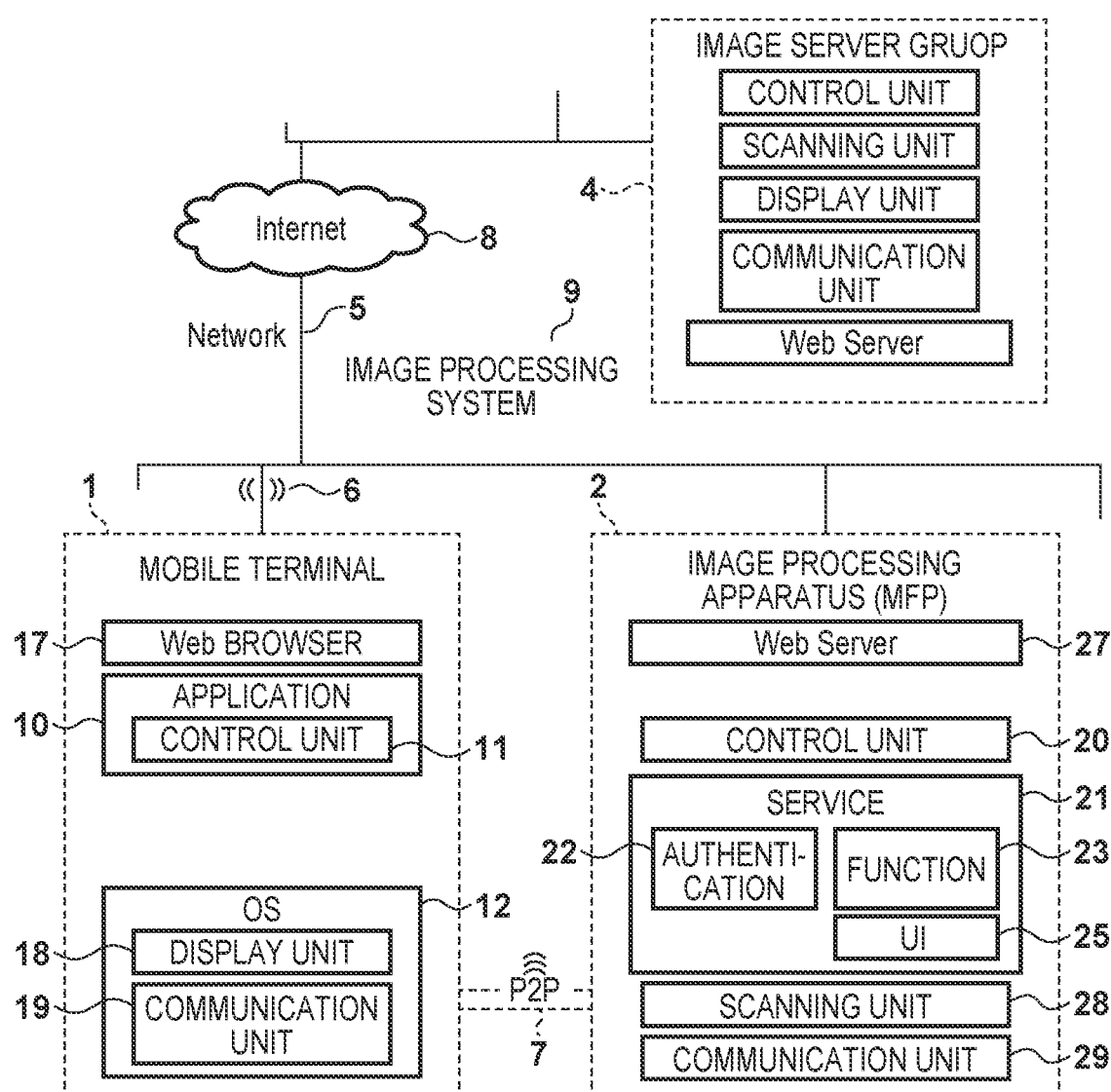
FIGS. 3A and 3B are block diagrams showing the software configurations of devices.

FIG. 3A is a block diagram showing the software configurations of the devices in the system. The functional units in the mobile terminal 1 are implemented when the CPU 111 loads programs received via the communication I/F 118 and stored in the external memory 123 to the RAM 112 and executes the loaded programs. Similarly, the functional units in the MFP 2 are implemented when the CPU 141 loads programs received via the communication I/F 148 and stored in the external memory 163 to the RAM 142 and executes the loaded programs.

A control unit 11 is a functional unit that controls the operation of an application 10 in the mobile terminal 1. An OS 12 of the mobile terminal 1 includes a communication unit 19. The communication unit 19 controls communication of the mobile terminal 1, and transmits/receives information to/from the MFP 2 or the image server 4. Note that the communication unit 19 controls a plurality of communication methods such as the mobile communication 6 to the network 5 or the P2P communication 7. The communication unit 19 also has a function of storing information necessary for communication. When communicating with the MFP 2 or the web sever of the image server 4, the mobile terminal 1 uses a web browser 17 as a web client.

A control unit 20 of the MFP 2 controls scanning and communication processing. More specifically, the control unit 20 controls the communication function of an MFP communication unit 29 via the communication I/F 148 and the scanning function of a scanning unit 28 of the MFP via the scanner I/F 146. Note that to make the mobile terminal 1 and the MFP 2 cooperate, the communication units 19 and 29 communicate using a specific communication protocol and transmit/receive jobs. Authentication information is saved in the MFP communication unit 29 as well.

The MFP 2 also includes a service 21 as a function group to be provided from the MFP to the terminal via the MFP communication unit 29. The service 21 includes an authentication service 22, a function service 23, a status service 24, and a UI service 25. The MFP 2 provides the information of these provided services to the terminal. The information includes the type, capability, and location (URL) of each service, and is included in the above-described notification signal or a response to a request. When the terminal requests a service to be used of the MFP 2, the control unit 20 of the MFP 2 loads and constructs the service and returns it to the terminal. The control unit 20 of the MFP 2 controls the scanning unit and the like based on a request to the service 21.

The authentication service 22 is a service that provides the authentication function of the MFP 2 to the terminal via the communication unit 29. The authentication service 22 executes and manages authentication processing such as authentication to the MFP or approval of the MFP. The function service 23 is a service that provides the scanning function or printing function of the MFP 2 to the terminal via the communication unit 29. The function service 23 executes and manages scanning processing such as application, execution, cancel, and the like of a job. The UI service 25 is a service that provides the UI function of the MFP 2 to the terminal via the communication unit 29. The UI service 25 is a service that provides a UI display screen and UI processing such as setting, display, and instruction for the MFP 2. For example, a setting UI of the MFP, a display UI of the operation state of the MFP, a function instruction UI to the MFP, and the like are provided. The operation of the service 21 will be described later. When web-connecting to the MFP 2 or the image server 4, the mobile terminal 1 accesses the web server of each device.

The image server 4 is a cloud image service including a control unit, a scanning unit, a display unit, and a communication unit. The image server 4 cooperates with the mobile terminal 1 or the MFP 2. That is, the image server 4 is configured to be operable according to the operation of the mobile terminal 1 or the MFP 2. For example, the image server 4 can cooperatively perform part of processing or manages the operations of a plurality of mobile terminals 1 and MFPs 2. For example, an application 10 is a web application arranged in the image server 4. The application 10 is downloaded to the mobile terminal 1 and locally operates on the web browser 17. The image server 4 also performs, for example, an operation of recording operation information uploaded from the mobile terminal 1 and the MFP 2. Note that the same processes as those in the mobile terminal 1 or the MFP 2 can be arranged in the image server 4. The same processes as those in the mobile terminal 1 or the MFP 2 can be arranged in the PC terminal 3 as well.

Figure 3B:
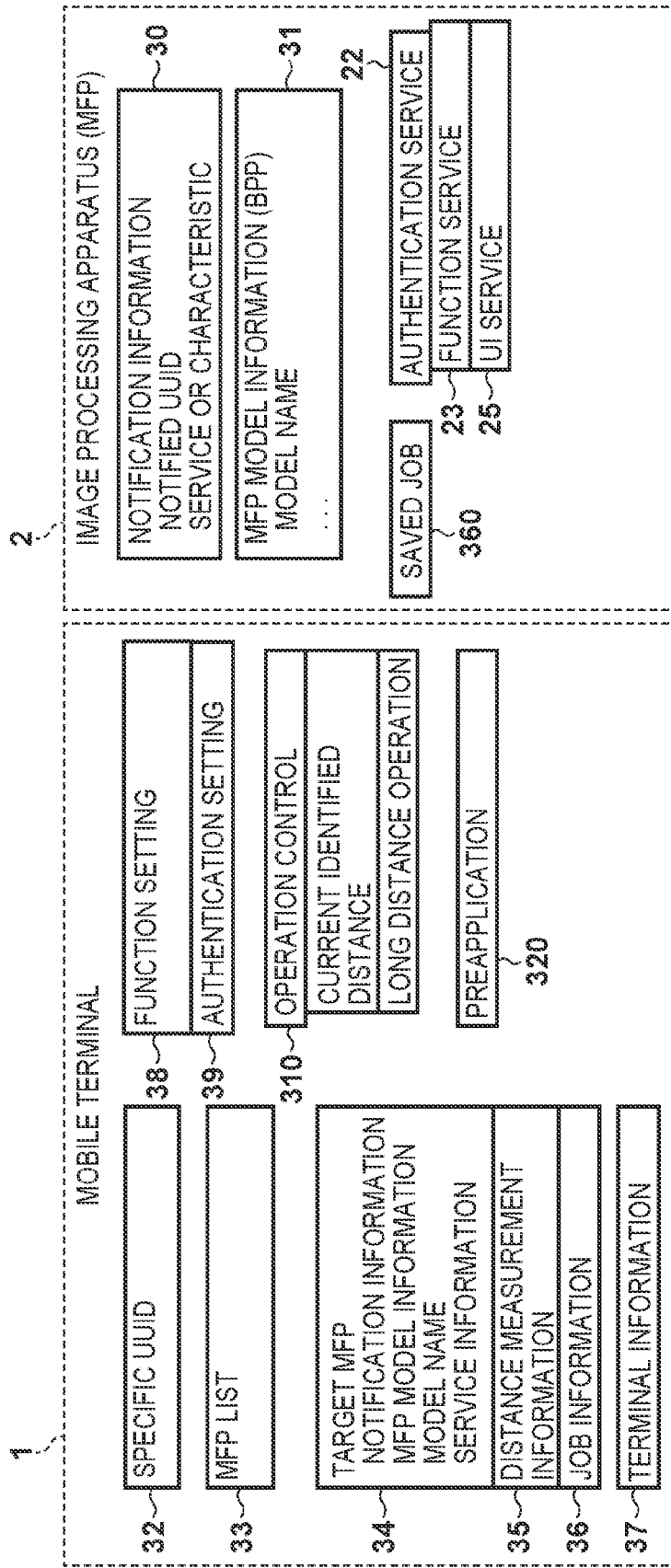

FIG. 3B is a view exemplarily showing data managed by the devices. Data of the mobile terminal 1 and data of the MFP 2 will be described in this order.

A specific UUID 32 is a preset value used by the application 10 to specify a target MFP. An MFP list 33 is a list of MFPs detected from the mobile terminal 1. A target MFP 34 stores information of an MFP selected as a scanning target. Distance measurement information 35 stores the distance measurement information between the mobile terminal 1 and the MFP 2. Job information 36 stores information about a job. Terminal information 37 stores the information of the mobile terminal 1, for example, the destination information of the mobile terminal 1. A function setting 38 and an authentication setting 39 store the functions and authentication settings of the image processing system 9 and the application 10. An operation control table 310 is table data used to control an operation or a screen based on an execution function and an identified distance, and details will be described later. A preapplication 320 is the data of a preapplication made from the mobile terminal 1 to the MFP 2 before job execution, and details will be described later.

Notification information 30 includes the contents of a signal transmitted from the MFP 2. MFP model information 31 is information that describes a model use method provided by the MFP 2 to perform communication with the mobile terminal 1 and processing. A saved job 360 is the data of a job saved in the external memory 163 by the MFP 2, and details will be described later. As described above, the MFP 2 includes the service 21, and the service 21 includes the authentication service 22, the function service 23, and the UI service 25. Data used for the operations and control are included in the service 21. For example, the terminal can use the authentication service 22 including authentication information data. How to use data and details of data will be described later.

<Example of Operation Arrangement of Image Processing System>

FIGS. 4A and 4B are views for explaining the distance between the mobile terminal and the MFP and a display example of the MFP selection screen corresponding to each distance. FIG. 4A exemplarily shows discretely set distances from the MFP.

Here, a user 41 is assumed to operate the mobile terminal 1 to cause the MFP 2 to scan an original. The MFP 2 transmits a notification signal 40. The mobile terminal 1 detects the notification signal 40 (dotted line 410) of the MFP 2, and communicates with the target MFP (dotted line 411), and an original 49 is scanned. The coverage of the notification signal 40 is identified as Immediate 43, Near 44, or Far 45 by the distance. The range where the signal cannot reach is "outside 46". The user 41 and the mobile terminal 1 move between the above-described regions (dotted line 420).

FIG. 4B shows a display example of the MFP selection screen of the application 10 of the mobile terminal 1.

The application 10 is activated as indicated by a screen 450. The user selects a [send] button 451 on the screen 450. The application 10 then displays a command window 461. When the user presses a [notification detection] button 462 in the command window 461, an MFP list 463 is displayed. The user selects an MFP to scan from the MFP list 463.

After that, the application 10 displays a scanning function start screen 470. The scanning function start screen 470 is a screen configuration as the starting point of the scanning function. Note that the application may display the command window 461 by another operation. An example in which the [notification detection] button 462 is prepared has been described. However, the MFP list may be displayed from a scanning menu to select an MFP.

<Operation when Mobile Terminal and MFP are Close to Each Other (Guidance to Mobile Terminal Operation)>

Figure 5B:
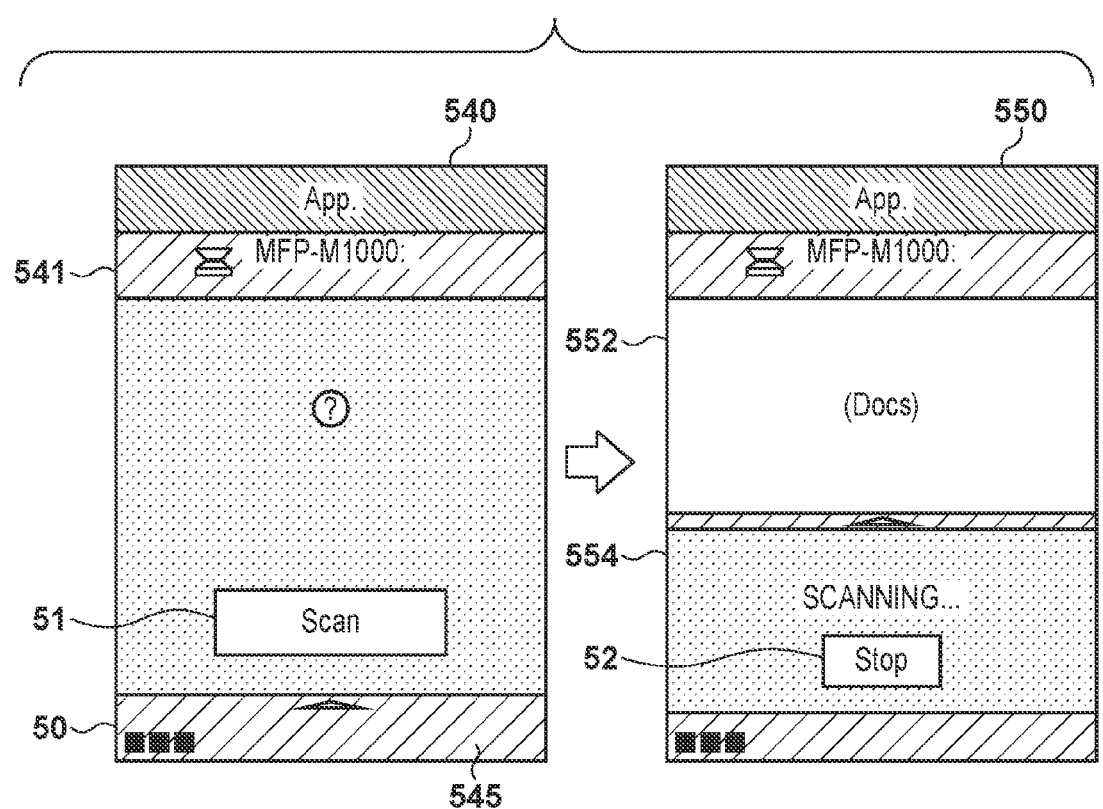

FIGS. 5A and 5B are views for explaining an operation when the mobile terminal and the MFP are close to each other. FIG. 5A is a view exemplarily showing a state in which the mobile terminal 1 is operated near the MFP 2 ("Immediate 43" in FIG. 4A).

The user 41 moves close to the MFP 2 together with the mobile terminal 1 and the original 49 (dotted line 520). The mobile terminal 1 receives the notification signal 40 output from the MFP 2 (dotted line 410). For example, when the user 41 enters the region of "Immediate 43", a [scan] button 51 is displayed on the screen of the mobile terminal 1. The user 41 sets the original 49 on the scanner of the MFP 2, and presses the [scan] button 51 displayed on the mobile terminal. With this operation, the image of the original 49 is loaded from the MFP 2 to the mobile terminal 1 (411).

FIG. 5B is a view exemplarily showing a screen display including the [scan] button 51, which is displayed on the mobile terminal 1. When the user 41 and the mobile terminal 1 move close to the MFP 2 and enter, for example, the region of "Immediate 43", a screen 540 is displayed.

The screen 540 includes a selected MFP display 541 and a distance measurement window 545. The selected MFP display 541 displays the MFP selected in the above-described MFP selection screen. Here, M1000 is selected as the MFP. The distance measurement window 545 displays the state and information of distance measurement from the mobile terminal 1 to the MFP 2, and includes a region mark 50. The region mark 50 is a range indicator corresponding to, for example, Far 45, Near 44, and Immediate 43 described with reference to FIG. 4A according to an identified distance. If the identified distance is "outside 46", the region mark 50 is not displayed.

After scanning execution, the application 10 displays a screen 550. If a response to the user 41 is necessary, the application 10 displays a response display 554 from the distance measurement window 545. The response display 554 displays status information, message display, command, and the like to the user. For example, the response display 554 in the screen 550 after scanning execution displays a "scanning . . . " message and a [Stop] button to instruct stop of scanning, as indicated by a display 52.

Note that the response display 554 may be configured to be displayed by the program as needed, or may be configured to be displayed/hidden by a user operation. The image of the scanned original is displayed in a document window 552 of the application 10.

<Operation when Mobile Terminal and MFP are Apart from Each Other (Guidance to MFP Operation)>

FIGS. 6A and 6B are views for explaining an operation when the mobile terminal and the MFP are apart from each other. FIG. 6A is a view exemplarily showing a state in which the mobile terminal 1 exists apart from near the MFP 2 ("Far 45" in FIG. 4A).

The user 41 leaves the mobile terminal 1 behind and moves close to the MFP 2 together with the original 49 (dotted line 620). The mobile terminal 1 receives the notification signal 40 output from the MFP 2 (dotted line 410). In this case, the mobile terminal 1 exists in the region of "Far 45", and the [scan] button 51 is not displayed on the screen. The user 41 sets the original 49 on the scanner of the MFP 2, and presses the [start] button of the operation unit of the MFP 2. The operation unit of the MFP 2 will be described later with reference to FIG. 7. After that, the image of the original 49 is transmitted from the MFP 2 to the mobile terminal 1 (dotted line 411).

FIG. 6B shows an example of screen display when the [scan] button 51 is not displayed on the mobile terminal 1. If the mobile terminal 1 is located apart from the MFP 2, for example, in the region of "Far 45", the [scan] button 51 is not displayed on a screen 630 or 640 of the application 10. The screens 630 and 640 are different in the presence/absence of an operation of confirming with the user 41 whether to receive the image transmitted from the MFP 2. The screen 630 includes a window 53 in which a [receive] message is arranged. On the other hand, the screen 640 includes a window 54 in which [Yes] and [No] buttons to accept a confirmation instruction from the user are arranged in addition to a "receive?" message.

After scanning execution, the application 10 displays a screen 650. For example, a response display 560 in the screen 650 after scanning execution displays a "receiving . . . " message 55. Note that since the user is guided to the MFP operation, as described above, no command button used to input an operation instruction is displayed on, for example, the screen 650.

<Example of Operation Screen of MFP>

Figure 7:
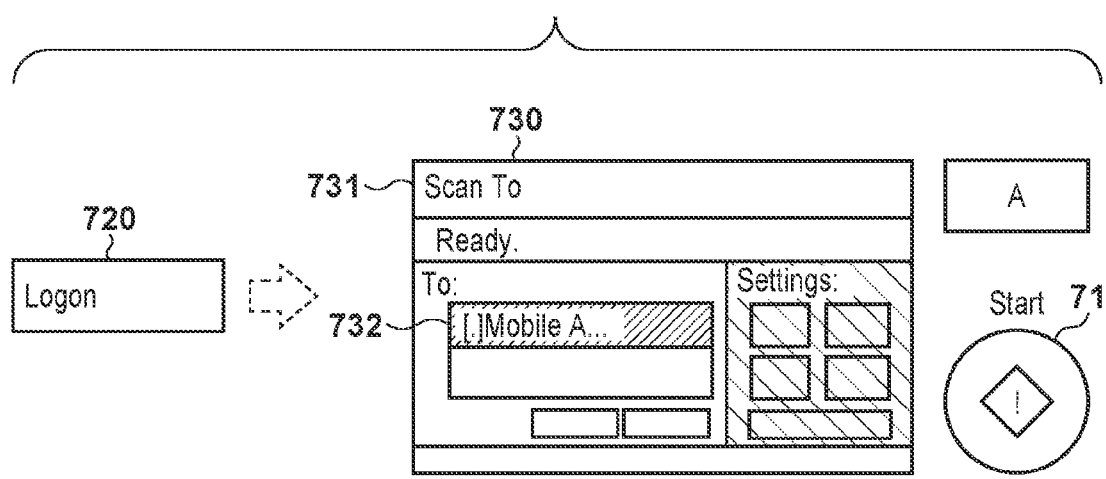
FIG. 7 is a view exemplarily showing the operation screen of the MFP.

FIG. 7 is a view exemplarily showing the operation screen of the MFP.

As described above, to operate the operation unit of the MFP 2, the user 41 starts a logon operation to the MFP 2 by pressing a [Logon] button 720. This is done in a case in which an authentication function for managing the MFP 2 is enabled. The user performs an authentication operation for the MFP 2 by inserting a card or inputting a PIN code.

When the user logs on, an MFP operation screen 730 is displayed on the MFP 2. The MFP operation screen 730 is switched to the push scanning mode to the mobile terminal 1 (display 731) and the mobile terminal 1 is set as the destination of scanning (display 732). That is, when the MFP 2 is selected from the mobile terminal 1, the MFP 2 can know in advance that the mobile terminal 1 wants to execute scanning. For this reason, the MFP 2 can automatically display the screen 730. Details will be described later. When the user presses a [start] button 71 on the MFP operation screen 730, scanning is executed.

<Example of Relationship between Screen Display and Operations Corresponding to Distances>

Figure 8A:
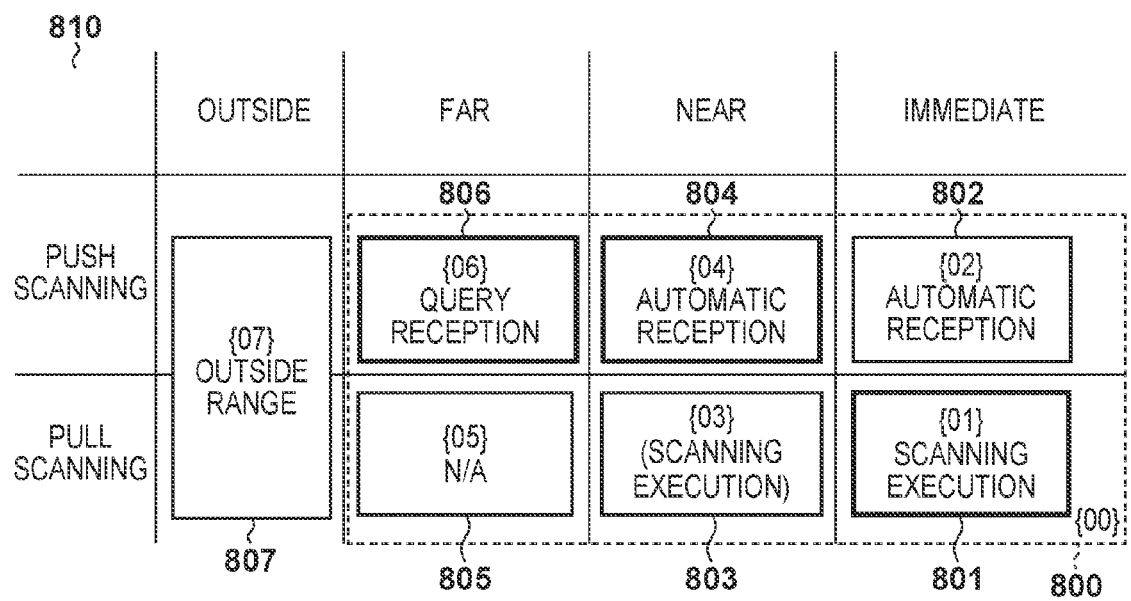
FIGS. 8A and 8B are views exemplarily showing a table that defines operations corresponding to the distances between the mobile terminal and the MFP and display screens corresponding to the distances.
Figure 8B:
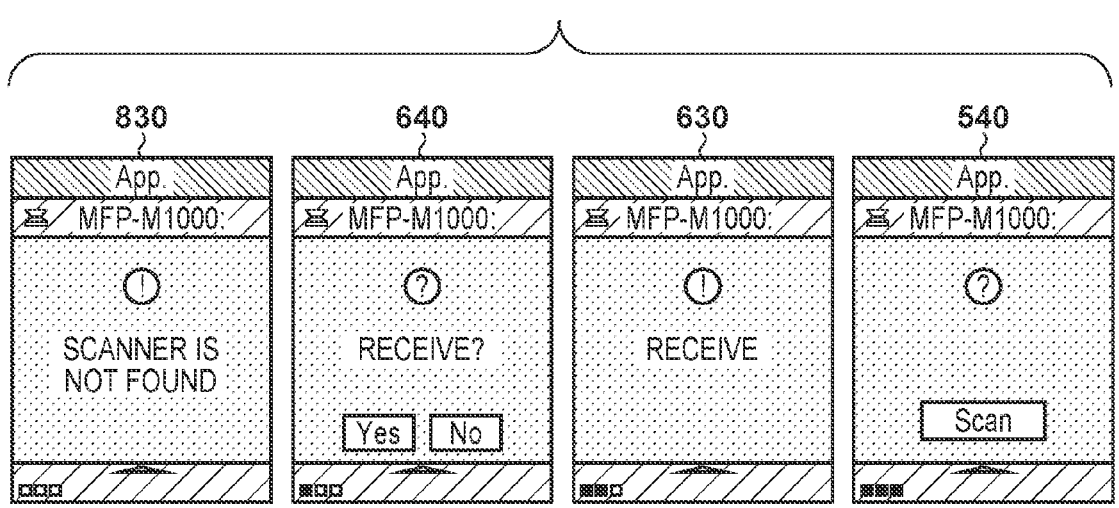

FIGS. 8A and 8B explain an example of the relationship between screen display and operations corresponding to distances. FIG. 8A shows a table that defines operations corresponding to distances. FIG. 8B exemplarily shows display screens corresponding to the distances.

The scanning modes and the contents of operations will be described in correspondence with each identified distance. If the identified distance is "outside 46", the mobile terminal 1 is located outside the range of the notification signal 40 from the MFP 2, and an operation of "{07} outside range" is performed independently of the scanning mode (display 807). An example of screen display at the time of the operation of "{07} outside range" is a screen 830. Note that cases other than "{07} outside range" will generally be described as "{00} within range". More specifically, "{00} within range" includes {01} scanning execution, {02} automatic reception, {03} scanning execution, {04} automatic reception, {05} N/A, and {06} query reception to be described below.

If the identified distance is "Far 45", the mobile terminal 1 is located in a region apart from the MFP 2. For this reason, the user 41 operates the mobile terminal 1, and does not set the original 49 on the scanner. In addition, since the operation is performed in a remote place, security needs to be maintained. Hence, a pull scanning mode 47 by an operation of the mobile terminal 1 is "{05} N/A (without execution)" (portion 805). As a push scanning mode 48 by an operation of the MFP 2, an operation of {06} query reception is performed (portion 806). For this reason, it is determined here to perform a "{06} query reception" operation indicated by a bold frame as a default operation, and the user 41 is guided to push scanning. An example of screen display when guiding to "{06} query reception" is the screen 640.

If the identified distance is "Near 44", the mobile terminal 1 is located in a region close to the MFP 2. For this reason, the user 41 may operate the mobile terminal 1 and also set the original 49 on the scanner. In addition, since the operation is performed in a close place, convenience is preferably raised relative to security. Hence, the pull scanning mode 47 by an operation of the mobile terminal 1 is a "{03} scanning execution" operation (portion 803). However, the operation can also be changed to N/A (without execution) by another setting. As the push scanning mode 48 by an operation of the MFP 2, a "{04} automatic reception" operation is performed (portion 804). For this reason, it is determined here to perform the "{04} automatic reception" operation indicated by a bold frame as a default operation, and the user 41 is guided to push scanning. An example of screen display when guiding to "{04} automatic reception" is the screen 630.

When the identified distance is "Immediate 43", the mobile terminal 1 and the MFP 2 exist in very close regions. For this reason, the user 41 can operate the mobile terminal 1 and set the original 49 on the scanner. In addition, since both devices can be operated nearby, convenience is preferably raised relative to security. Hence, the pull scanning mode 47 by an operation of the mobile terminal 1 is a "{01} scanning execution" operation (portion 801). As the push scanning mode 48 by an operation of the MFP 2, a "{02} automatic reception" operation is performed (portion 802).

For this reason, it is determined here to perform the "{01} scanning execution" operation indicated by a bold frame as a default operation, and the user 41 is guided to pull scanning. An example of screen display when guiding to "{01} scanning execution" is the screen 540.

An example has been described here in which the user is guided to pull scanning if the distance from the MFP 2 is "Immediate 43" shorter than a predetermined distance, and guided to push scanning if the distance is "Near 44" or "Far 45" not less than the predetermined distance. However, the predetermined distance used as a threshold may be set to the boundary between "Near 44" and "Far 45" or set to another distance.

<Example of Operation in Case in which User Operates MFP when Guided to Terminal Operation>

Even when guided to the MFP operation or mobile terminal operation, the user may perform an operation different from the guidance.

Figure 9A:
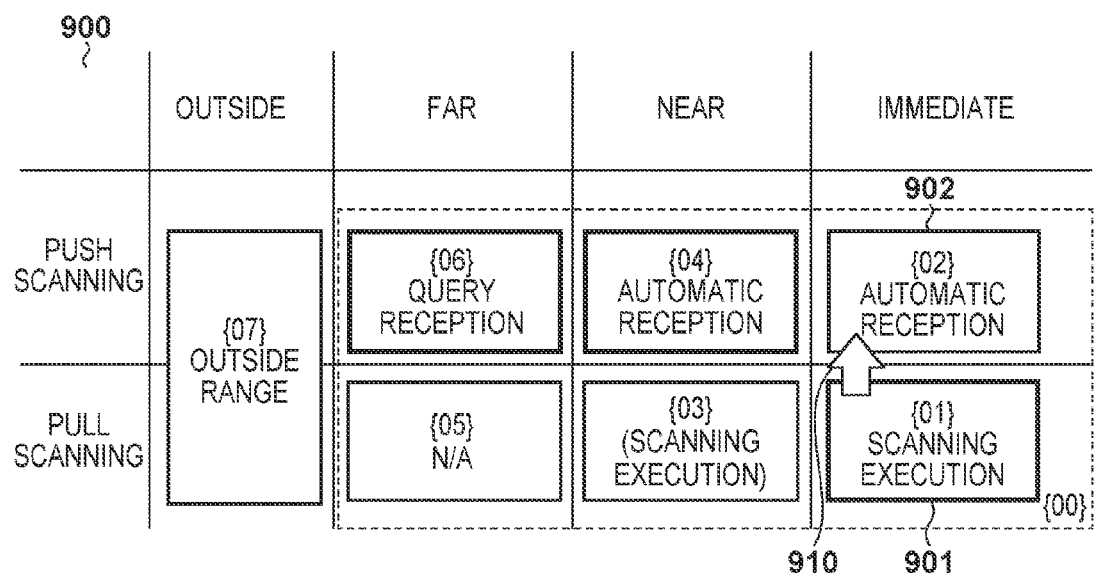
FIGS. 9A and 9B are views exemplarily showing operations in a case in which a user operates the MFP when guided to a mobile terminal operation.
Figure 9B:
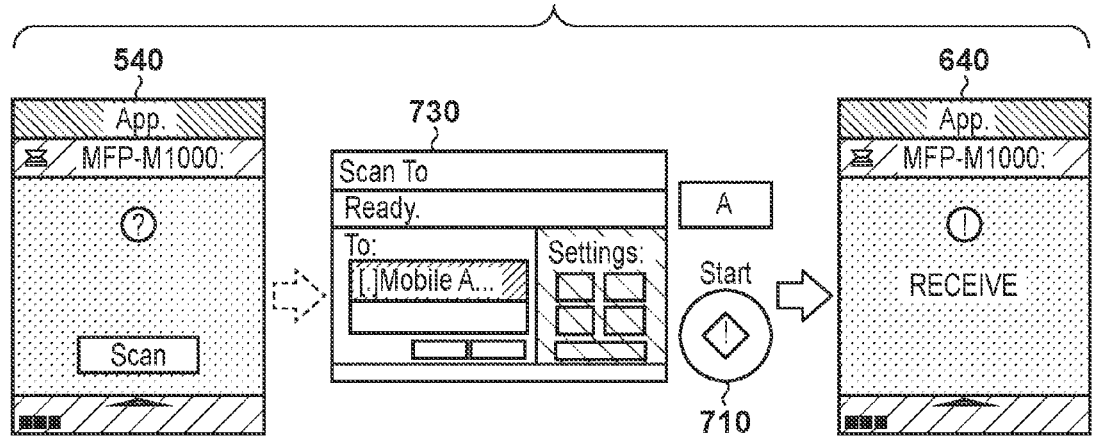

FIGS. 9A and 9B are views exemplarily showing operations in a case in which the user operates the MFP when guided to the mobile terminal operation. FIG. 9A shows a table that defines operations, and FIG. 9B shows transition of the display screen.

When the identified distance is "Immediate 43", the mobile terminal 1 and the MFP 2 exist in very close regions, and the user 41 can operate both devices nearby. For this reason, when the identified distance is "Immediate 43" in a table 900, the user 41 is guided to the "{01} scanning execution" operation in the pull scanning mode 47.

In this state, the user 41 is assumed to operate the MFP 2. In this case, the operation transits to the "{02} automatic reception" operation in the push scanning mode 48 (transition 910). That is, the mode changes to the push scanning mode 48, and the operation changes to the "{02} automatic reception" operation.

An example of screen display will be described. When the identified distance is "Immediate 43", the screen 540 including the [scan] button 51 is displayed on the mobile terminal 1. That is, the user is guided so as to use the pull scanning mode 47. In this state, the user 41 is assumed to operate the MFP 2 (MFP operation screen 730) and press the [start] button 71. In this case, the mobile terminal 1 and the MFP 2 change to the push scanning mode 48. The mobile terminal 1 switches to the screen 630 of automatic reception and operates.

<Example of Operation in Case in which Mobile Terminal During Function Execution Moves Away from MFP>

The user can freely move, taking the mobile terminal 1 with him/her. Hence, the distance between the mobile terminal 1 and the MFP can change during execution of a function such as scanning.

Figure 10A:
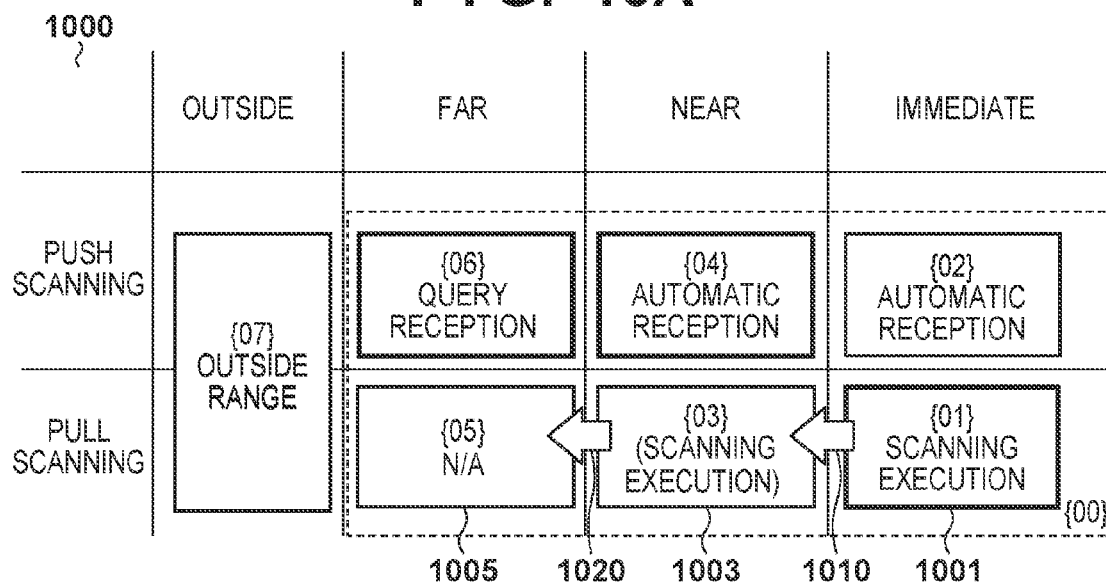
FIGS. 10A and 10B are views exemplarily showing an operation in a case in which the mobile terminal during function execution moves away from the MFP.
Figure 10B:
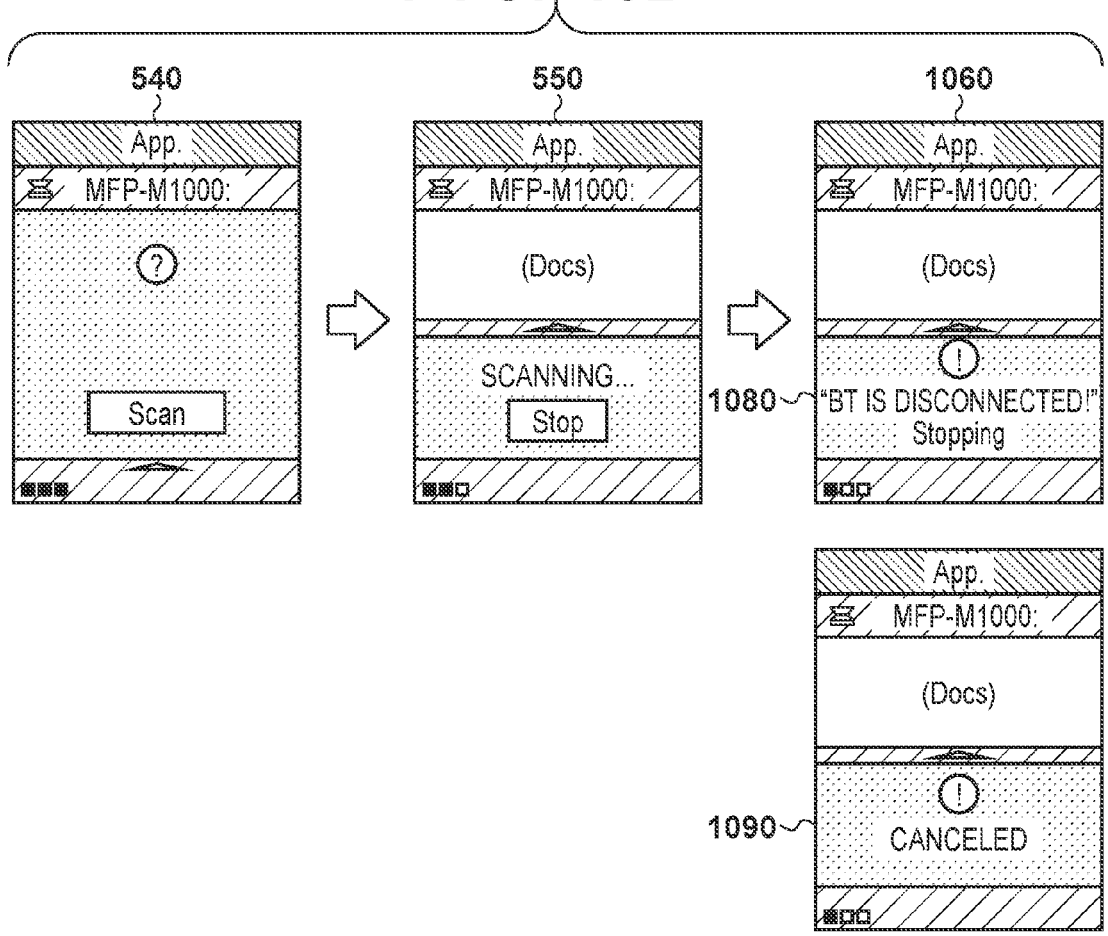

FIGS. 10A and 10B are views exemplarily showing an operation in a case in which the mobile terminal during function execution moves away from the MFP. FIG. 10A shows a table that defines operations, and FIG. 10B shows transition of the display screen.

When the identified distance is "Immediate 43" in a table 1000, the user 41 is guided to the "{01} scanning execution" operation in the pull scanning mode 47. Assume that from this state, the user 41 moves away from the MFP 2 together with the mobile terminal 1 after scanning execution.

The user moves away from "Immediate 43" to "Near 44" during scanning execution (transition 1010). At this time, although the identified distance changes to "Near 44", scanning execution continues. The user further moves away from "Near 44" to "Far 45" during scanning execution (transition 1020). If the user further moves to "outside", wireless communication is impossible out of the range. Hence, the state of moving away is fed back to the user 41 (display on the screen or warning by a sound) at the stage of "Far 45", that is, at the stage of "{05} N/A".

An example of screen display will be described with reference to FIG. 10B. When the identified distance is "Immediate 43", the screen 540 including the [scan] button 51 is displayed on the mobile terminal 1 to guide the user to the pull scanning mode 47. The user 41 instructs scanning execution by pressing the [scan] button 51 in accordance with the guidance. At this time, the mobile terminal 1 displays the scanning screen 550. After that, the mobile terminal 1 moves away from "Immediate 43" to "Near 44" (the operation changes from {01} to {03}) together with the user 41 while keeping the scanning screen 550 displayed.

When moving away up to "Far 45", the mobile terminal 1 displays a scanning interrupt screen 1060 and then displays a job interrupt message 1080. The state of moving away from the MFP 2 is thus fed back to the user 41. An example in which scanning is stopped (interrupted) to avoid abrupt disconnection has been described here. However, scanning execution may be continued, and a warning message may be displayed. An example of a screen when scanning is canceled is a message 1090.

<Example of Operation in Case in which Mobile Terminal Moves Out of Communication Range of MFP and Returns into Communication Range Again>

Figure 11A:
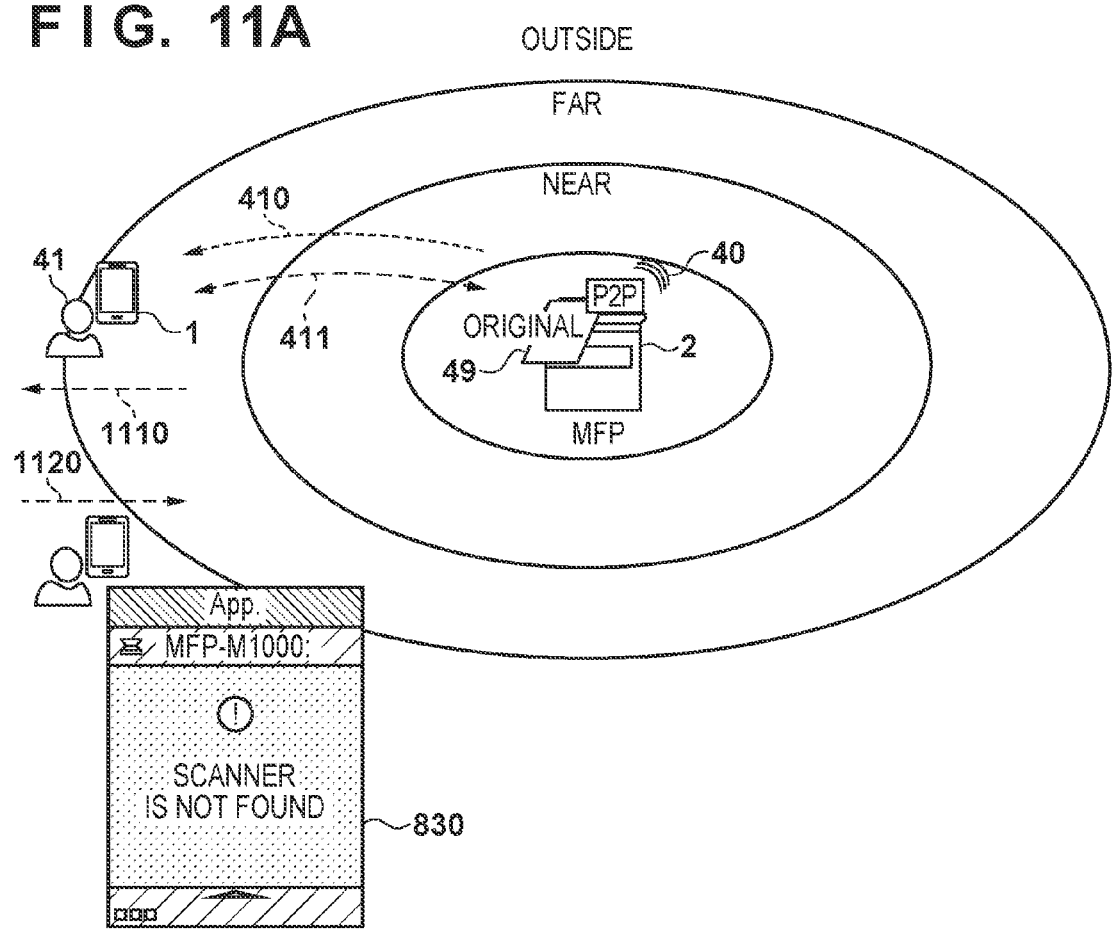
FIGS. 11A to 11C are views exemplarily showing an operation in a case in which the mobile terminal during function execution moves out of the communication range of the MFP and then returns into the communication range again.
Figure 11B:
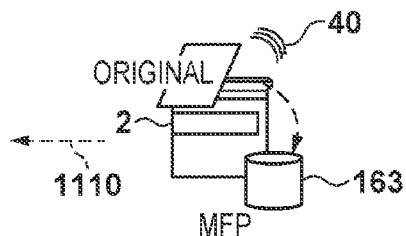
Figure 11C:
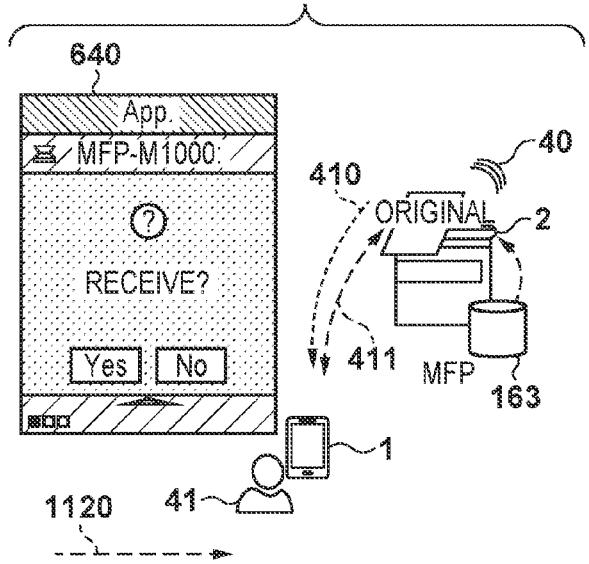

FIGS. 11A to 11C are views exemplarily showing a mobile terminal during function execution. FIG. 11A exemplarily shows a state in which the mobile terminal 1 moves out of the range of the notification signal 40 of the MFP 2 ("outside 46") and then returns into the range.

More specifically, the mobile terminal 1 detects the notification signal 40 of the MFP 2 (dotted line 410), communicates with the target MFP (dotted line 411), and executes a scanning job of the original 49. During this time, the user moves to the region of "outside 46", taking the mobile terminal 1 with him/her (dotted line 1110). The screen 830 representing that the mobile terminal is located outside the communication range is displayed on the screen of the mobile terminal 1 that has moved out of the range. A description will be made assuming a state in which from this state, the user 41 and the mobile terminal 1 return into the range of the notification signal 40 again (dotted line 1120).

FIG. 11B shows an operation when the user 41 and the mobile terminal 1 move "{07} outside range" of the notification signal 40 of the MFP during job execution (dotted line 1110). When the track of the mobile terminal 1 as the destination of the job is lost, the MFP 2 switches the job destination to the external memory 163 of the MFP 2. The MFP 2 saves the stored job in the external memory 163.

FIG. 11C shows an operation when the user 41 and the mobile terminal 1 which have moved out of the range during job execution return into the range of the notification signal 40 (dotted line 1120). When the user 41 and the mobile terminal 1 return "{00} within range" of the notification signal 40, the query reception screen 640 is displayed on the screen of the mobile terminal 1. When the user presses the [Yes] button on the query reception screen 640, the MFP 2 extracts the stored scanning job from the external memory 163, resumes the scanning job, and transmits the scanned image by communication with the mobile terminal 1 (dotted line 411).

<Detailed Examples of Setting Screen, Authentication Screen, and Data>

FIG. 12A shows examples of a function setting screen and an authentication setting screen of the application 10.

A function setting screen 1200 of the application 10 is an example of a screen to set the functions of the application 10. This is a screen to set the functional operations described above.

A setting 1201 to prefer pull scanning in proximity is a setting of an operation of guiding the user to pull scanning when he/she is located in proximity to the MFP 2. A setting 1202 to prefer pull scanning even in a close state is a setting of an operation of guiding the user to pull scanning when he/she is located near the MFP 2.

A setting 1203 to confirm reception in a far state is a setting of an operation of performing query reception when the user is located apart from the MFP 2. A setting 1204 to cancel a job at a long distance is a setting of an operation of canceling a job when the user moves out of the coverage of the MFP 2.

A setting 1205 to perform an operation only in pull scanning is a setting to cause the MFP to operate only in pull scanning.

An authentication setting screen 1210 of the application 10 is an example of an authentication screen for the MFP 2. The authentication setting screen 1210 includes, for example, input fields for an account and a password.

FIG. 12B shows detailed examples of various kinds of data used in the system.

The operation control table 310 holds table data used to control the operation or screen in accordance with an execution function and an identified distance. For example, the data define operations and screens in respective cases based on a table 810 shown in FIG. 8A.

In the operation fields, values "enable", "hidden", and "disable" are recorded. A recommendation mark 1250 "*" representing a default setting is also recorded. In the screen fields, display screens to be used are set. These data are set in accordance with the function setting screen 1200. Data setting processing for this table will be described later with reference to a flowchart.

The operation control table 310 includes data of a current identified distance 311 and a long distance operation 312. As the current identified distance 311, the current region index is recorded. The current region index is recorded in a normal field 1220. A region index during job execution is separately recorded in a field 1221 for job.

As the long distance operation 312, continuation of processing at a long distance during job execution is set. This setting is interlocked with the control 1204 in the function setting screen 1200, and a value "true" or "false" is set in the field.

The preapplication 320 is the information of a preapplication made from the mobile terminal 1 to the MFP 2 before job execution. The preapplication 320 includes the information of a target function, terminal information 37, and the operation control table 310. For example, when the mobile terminal 1 makes an application for the scanning destination and function control range to the MFP 2, the MFP 2 can display an already set operation unit.

The saved job 360 is data when the MFP 2 saves a job in the external memory 163. The saved job 360 has information accompanying a job, and includes the preapplication 320, the job information 36, and scanned data 1240. The MFP 2 extracts the saved job 360 from the external memory 163 and processes it as a job again.

<Operation of Image Processing System>

Figure 13:
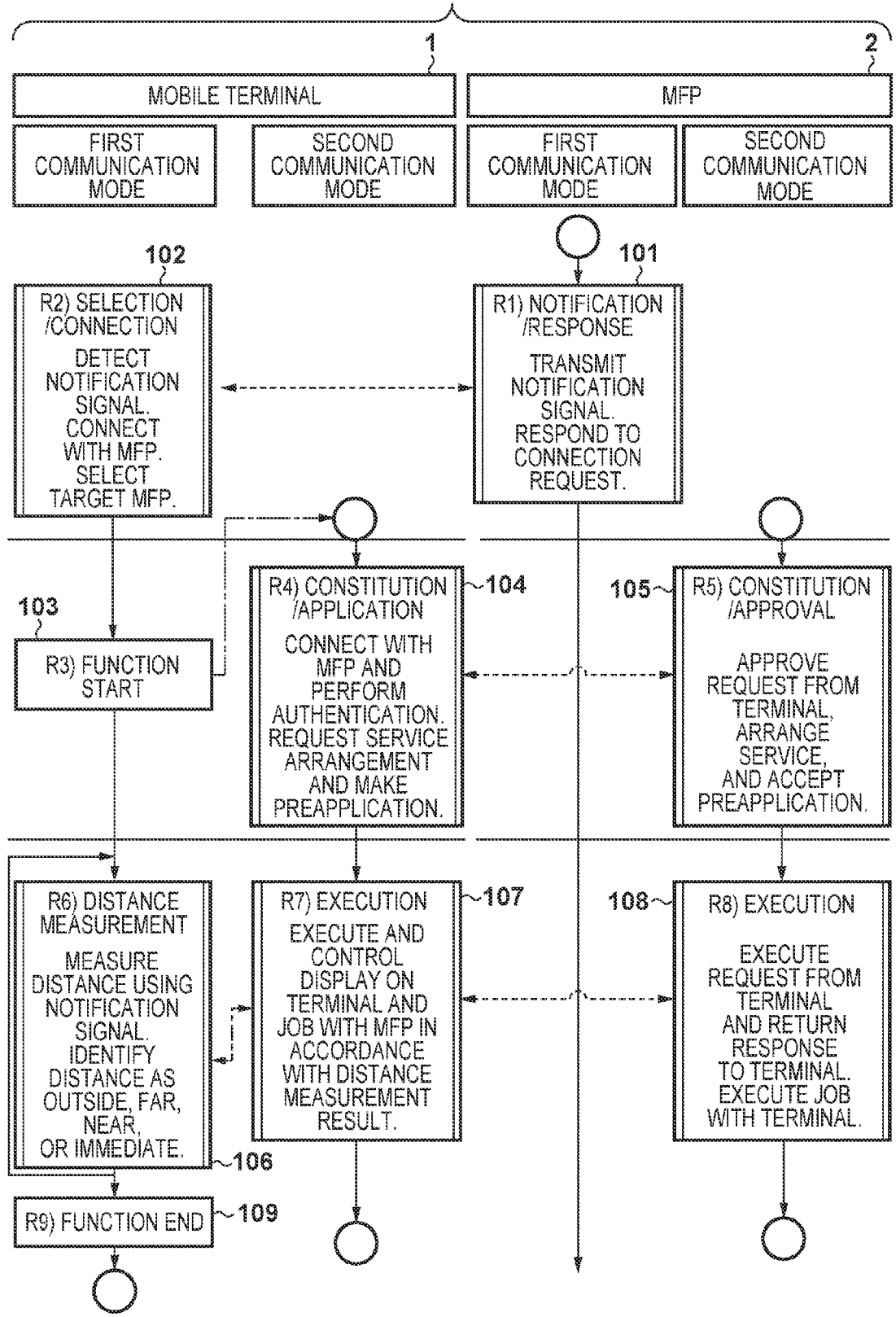
FIG. 13 is a flowchart showing overall processing of the image processing system.

FIG. 13 is a flowchart showing overall processing of the image processing system. FIG. 13 also shows an operation executed by the control unit 11 of the application of the mobile terminal 1 and an operation executed by the control unit 20 of the MFP 2. For each device, processes associated with the first communication mode (LE mode) and the second communication mode (normal mode or the like) are identifiably illustrated. The procedure of the flowchart will be described here as large process blocks, and details of each process will be described later.

A process 101 is notification/response processing (R1) in the MFP 2. The control unit 20 of the MFP 2 transmits the notification signal 40 via the communication unit 29. The control unit 20 also responds to a connection request from the mobile terminal 1.

A process 102 is selection/connection processing (R2) in the mobile terminal 1. The control unit 11 of the mobile terminal 1 detects the notification signal via the communication unit 19. The control unit 11 connects with the MFP 2, investigates the information of each MFP, and selects a target MFP.

A process 103 is function start processing (R3) in the mobile terminal 1. The control unit 11 of the mobile terminal 1 detects a start instruction via a display unit 18.

A process 104 is constitution/application processing (R4) in the mobile terminal 1. The control unit 11 of the mobile terminal 1 connects with the MFP 2 via the communication unit 19 and performs authentication. The control unit 11 requests service arrangement of the MFP and makes a preapplication.

A process 105 is constitution/approval processing (R5) in the MFP 2. The control unit 20 of the MFP 2 approves the request from the mobile terminal 1 via the communication unit 29, arranges the service, and accepts the preapplication.

A process 106 is distance measurement processing (R6) in the mobile terminal 1. The control unit 11 of the mobile terminal 1 starts distance measurement processing (R6) in synchronism with the job start processing (R3). The control unit 11 of the mobile terminal 1 measures the distance from the MFP 2 using the notification signal 40 received via the communication unit 19. The control unit 11 identifies the distance as outside, far, near, or immediate.

A process 107 is job execution processing (R7) in the mobile terminal 1. The control unit 11 of the mobile terminal 1 executes and controls display on the terminal via the display unit 18 and a job (push scanning or pull scanning) with the MFP 2 via the communication unit 19 in accordance with the identified distance.

A process 108 is job execution processing (R8) in the MFP 2. The control unit 20 of the MFP 2 receives a request from the mobile terminal 1 via the communication unit 29, executes the job, and returns a response. The control unit 20 executes the job (push scanning or pull scanning) together with the mobile terminal 1.

A process 109 is function end processing (R9) in the mobile terminal 1. The control unit 11 of the mobile terminal 1 receives the response from the MFP 2 via the communication unit 19, and ends the function.

In the above-described way, the operation starts when the mobile terminal 1 detects the notification signal 40 continuously transmitted from the MFP 2. The application 10 of the mobile terminal 1 detects the distance from the MFP 2. If the distance is short, the user is guided to the pull scanning method by a terminal operation. If the distance is long, the user is guided to the push scanning method by an MFP operation. Note that depending on the use case, the system may be configured to guide the user to the push scanning method if the distance is short and guide the user to the pull scanning method if the distance is long.

<Flowchart of Process 102 (R2)>

Figure 14:
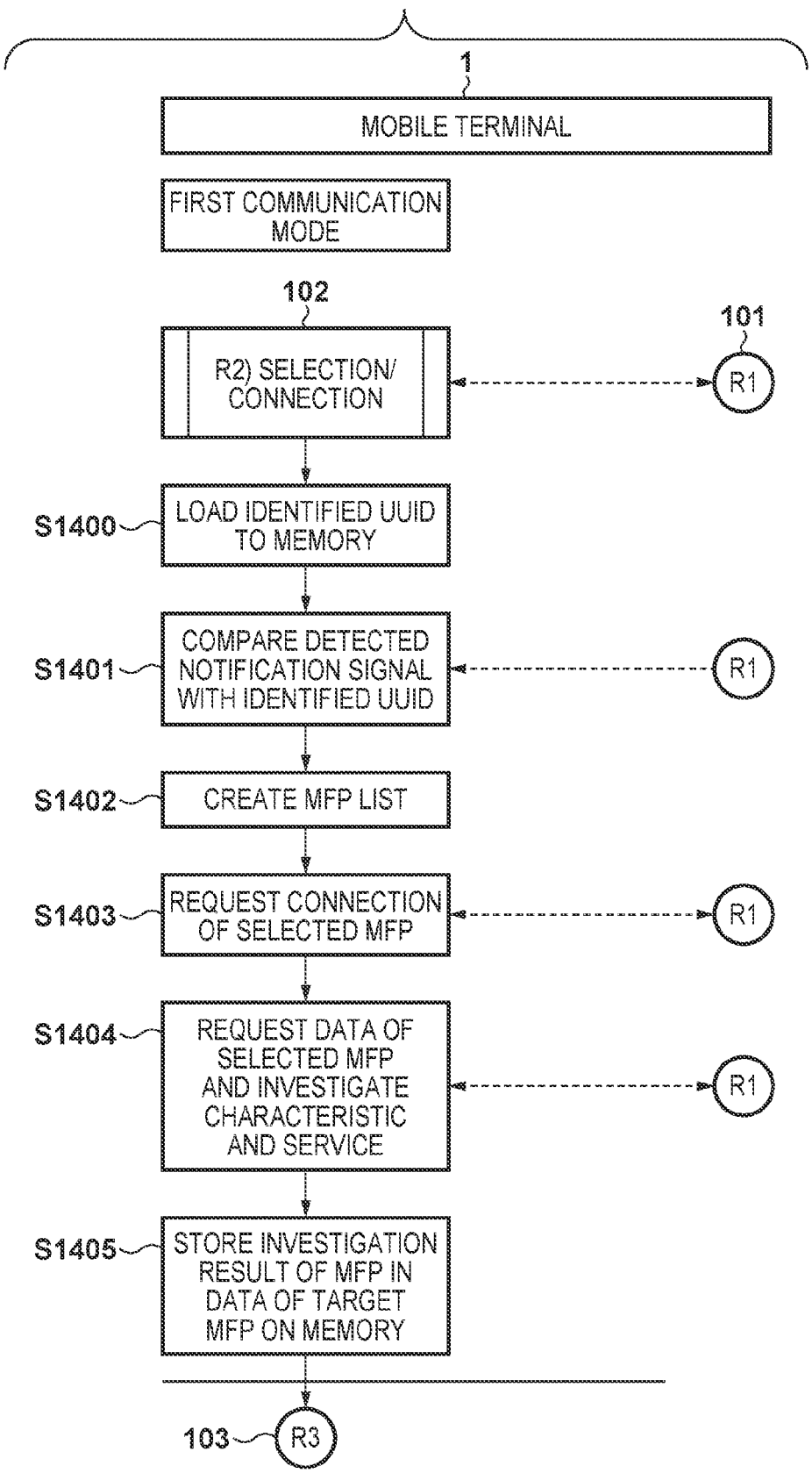
FIG. 14 is a flowchart of a process (R2) in the mobile terminal.

FIG. 14 is a flowchart of the process (R2) in the mobile terminal. In this process, the application 10 is executed by the control unit 11 of the mobile terminal 1. The control unit 11 detects the notification signal 40 via the communication unit 19. The control unit 11 connects with the MFP 2, investigates the information of each MFP, and selects a target MFP.

In step S1400, the control unit 11 loads the identified specific UUID 32 to the memory. In step S1401, the control unit 11 compares the UUID of the detected notification signal 40 with the identified specific UUID 32, and identifies the MFP device. In step S1402, the control unit 11 creates the MFP list 33.

In step S1403, the control unit 11 requests, via the communication unit 19, connection of the MFP 2 selected from the MFP list 33, and obtains a response. In step S1404, the control unit 11 requests, via the communication unit 19, data of the selected MFP 2, and investigates a characteristic and service from returned data. In step S1405, the control unit 11 stores the investigation result of the MFP 2 in the data of the target MFP 34 on the memory.

<Flowchart of Processes 103 (R3) and 104 (R4)>

Figure 15:
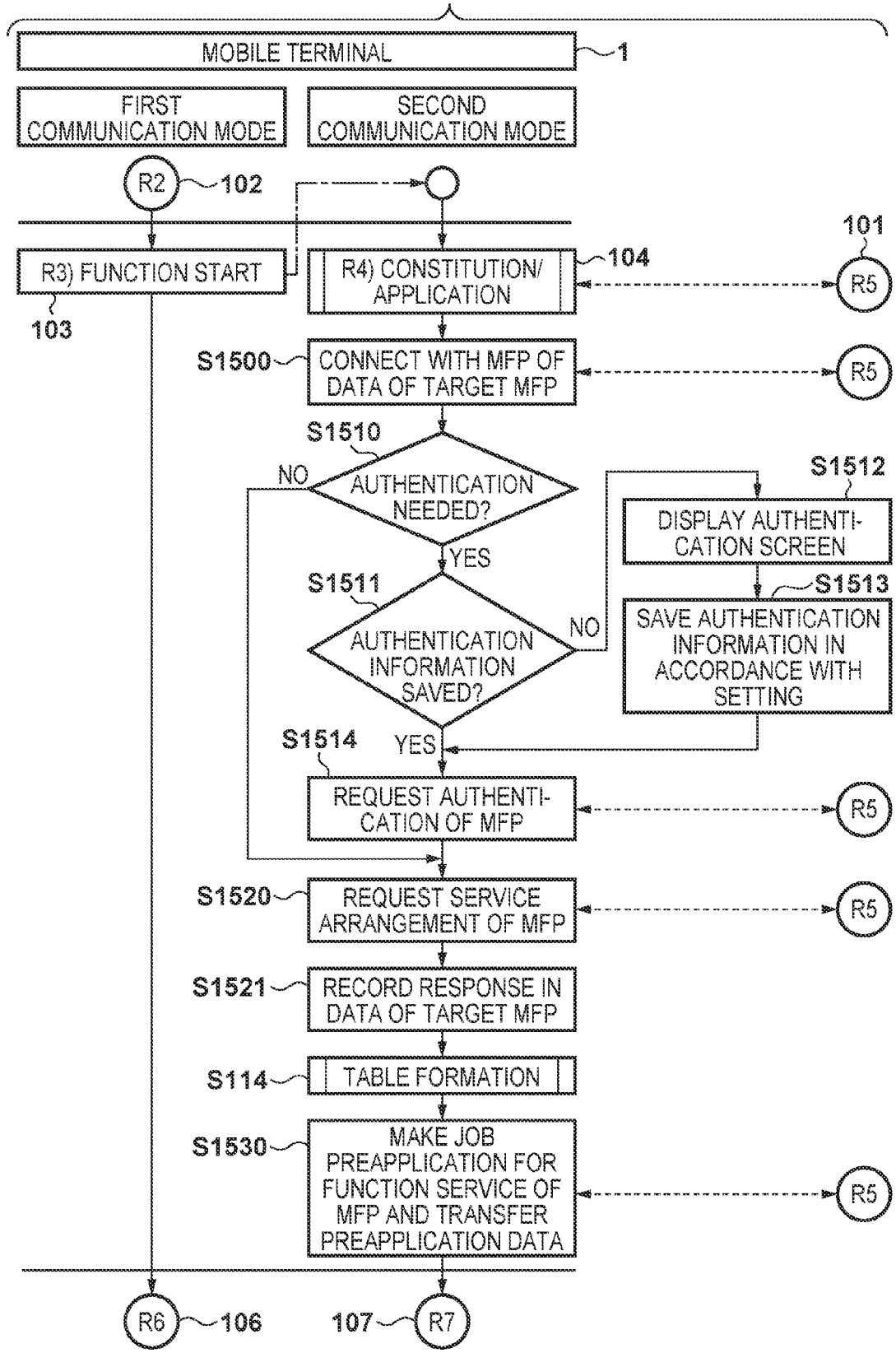
FIG. 15 is a flowchart of processes (R3) and (R4) in the mobile terminal.

FIG. 15 is a flowchart of the processes (R3) and (R4) in the mobile terminal. In this process, the application 10 is executed by the control unit 11 of the mobile terminal 1. The control unit 11 of the mobile terminal 1 detects the start of the function via the display unit 18. The control unit 11 of the mobile terminal 1 then connects with the MFP 2 via the communication unit 19 and performs authentication. The control unit 11 requests service arrangement of the MFP and makes a preapplication.

In step S1500, the control unit 11 refers to the data of the target MFP 34 on the memory and connects with the MFP 2 via the communication unit 19 in the second communication mode. In step S1510, if the MFP 2 needs authentication, the control unit 11 advances to step S1511. If the MFP 2 does not need authentication, the control unit 11 advances to step S1520. In step S1511, if authentication information is saved in the authentication setting 39, the control unit 11 advances to step S1514. If authentication information is not saved, the control unit 11 advances to step S1512.

In step S1512, the control unit 11 displays an authentication screen via the display unit 18. In step S1513, the control unit 11 saves the authentication information in the authentication setting 39 in accordance with the setting.

In step S1514, the control unit 11 requests authentication of the MFP 2 via the communication unit 19, and obtains a response. In step S1520, the control unit 11 requests service arrangement of the MFP 2 via the communication unit 19, and obtains a response. In step S1521, the control unit 11 saves the response in the data of the target MFP 34 on the memory. In step S114, the control unit 11 executes table formation processing 114 (to be referred to as "r4" in FIG. 15). Note that details of the table formation processing 114 will be described later with reference to FIG. 16.

In step S1530, the control unit 11 makes the preapplication 320 for the function service 23 of the MFP 2 via the communication unit 19, and obtains a response.

FIG. 16 is a flowchart showing details of table formation processing. In this process, the application 10 is executed by the control unit 11 of the mobile terminal 1. The control unit 11 of the mobile terminal 1 loads the operation control table 310 and edits it in accordance with a function setting.

In step S1610, the control unit 11 loads the operation control table 310 to the memory. In step S1620, if the setting 1205 to [perform an operation only in pull scanning] is ON, the control unit 11 advances to step S1621. On the other hand, if the setting 1205 is not ON, the control unit 11 advances to step S1630. In step S1621, the control unit 11 disables the operation field of the push scanning mode in the operation control table 310, and sets the screen to absent. The priority operation mark is moved to the pull scanning mode side.

In step S1630, if the setting 1201 to [prefer pull scanning in proximity] is ON, the control unit 11 advances to step S1631. If the setting 1201 is not ON, the control unit 11 advances to step S1632. In step S1631, the control unit 11 enables the operation of [immediate] of the pull scanning mode in the operation control table 310, adds the priority operation mark, and sets the screen. On the other hand, in step S1632, the control unit 11 removes the priority operation mark of [immediate] of the pull scanning mode.

In step S1640, if the setting 1202 to [prefer pull scanning even in a close state] is ON, the control unit 11 advances to step S1641. If the setting 1202 is not ON, the control unit 11 advances to step S1642. In step S1641, the control unit 11 enables the operation field of [near] of the pull scanning mode in the operation control table 310, adds the priority operation mark, and sets the screen. On the other hand, in step S1642, the control unit 11 removes the priority operation mark of [near] of the pull scanning mode.

In step S1650, the control unit 11 checks the priority operation for each identified distance in the operation control table 310. In step S1651, if the operation in the push scanning mode is enabled, but the priority operation is absent in both scanning modes, the control unit 11 advances to step S1652. If the priority operation is present, the control unit 11 advances to step S1660. In step S1652, the control unit 11 sets the push scanning mode to the priority operation for the identified distance of interest.

In step S1660, the control unit 11 ends check of the priority operation for each identified distance in the operation control table 310.

<Flowchart of Processes 106 (R6), 107 (R7), and 109 (R9)>

Figure 17B:
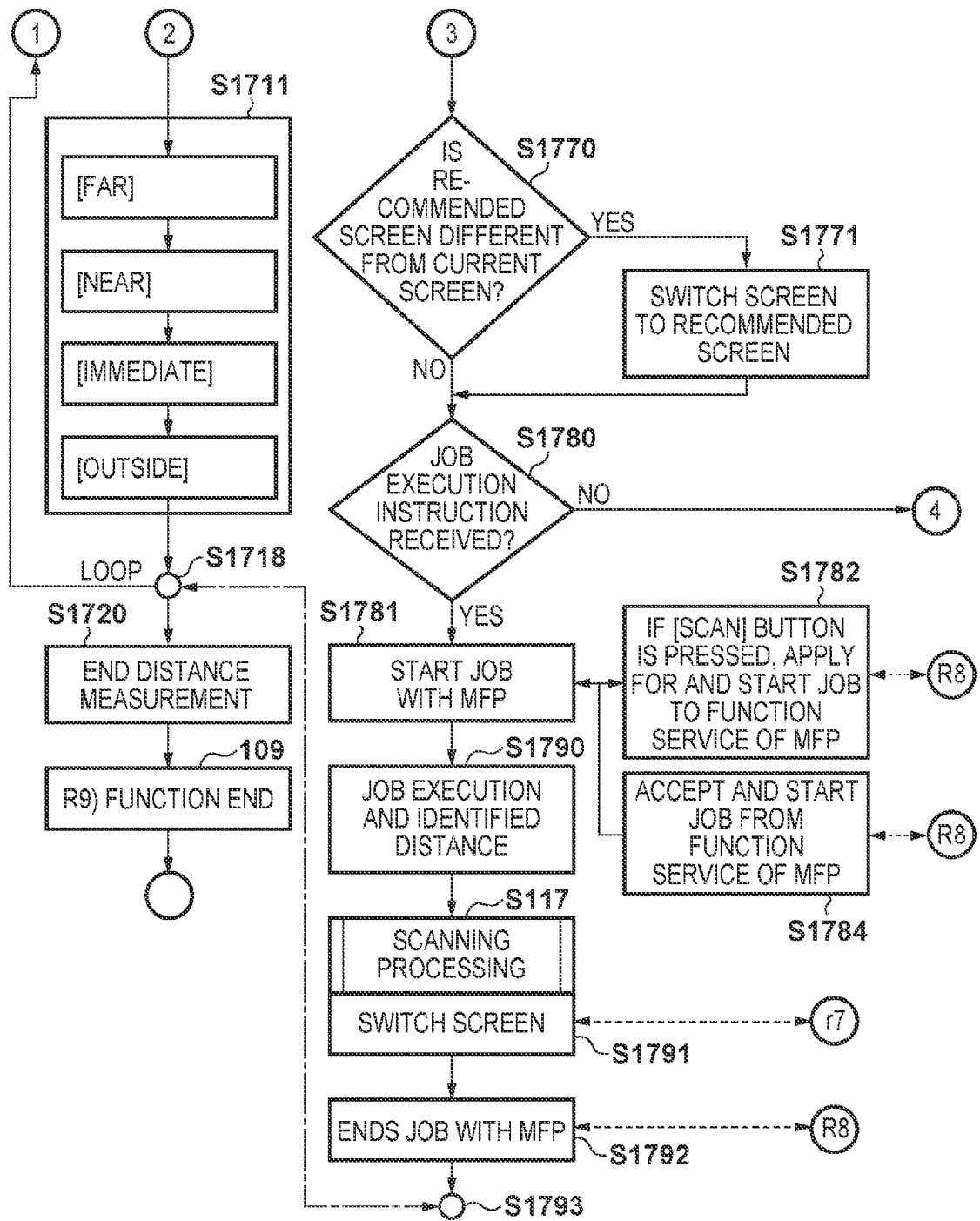

FIGS. 17A and 17B are flowcharts of the processes (R6), (R7), and (R9) in the mobile terminal. In this process, the application 10 is executed by the control unit 11 of the mobile terminal 1. The control unit 11 starts distance measurement processing (R6) in synchronism with the function start processing (R3). The control unit 11 measures the distance from the MFP 2 using the notification signal 40 received via the communication unit 19. The control unit 11 identifies the distance as outside, far, near, or immediate.

The control unit 11 executes display on the terminal via the display unit 18 and output or a cancel request to the MFP 2 via the communication unit 19 in accordance with the identified distance. After that, the control unit 11 receives a response from the MFP 2 via the communication unit 19, and ends the function.

In step S1700, the control unit 11 starts distance measurement. In step S1701, the control unit 11 identifies the distance. The distance is identified as outside, far, near, or immediate. This identification continues until the terminal moves out of the range of the notification signal 40 or function execution is completed. When this condition is met, the process advances to step S1720.

In step S1702, if the identified distance changes, the control unit 11 advances to step S1710. If the identified distance does not change, the control unit 11 returns to step S1701.

In step S1710, the control unit 11 starts operation selection according to the identified distance. The identified distance that has changed is recorded in the data of the distance measurement information 35. The control unit 11 selects step S1750 as an operation of region updating.

In step S1711, the control unit 11 selects an operation corresponding to the identified distance, that is, discrimination between "Far 45", "Near 44", "Immediate 43", and "outside 46". In this flowchart example, by the above-described region updating operation in step S1750, an operation is selected in the process 107 or a process 117 (to be referred to as "r7" in FIGS. 17A and 17B) to be described later. In step S1720, the control unit 11 ends the distance measurement.

In step S1750, the control unit 11 records the identified distance that has changed in the data of the current identified distance 311. A region updating notification from the distance measurement process 106 is also sent to the function service 23 of the service 21 of the MFP 2 via the process 107, the process 117, and the communication unit 19. Details will be described later. In step S1760, the control unit 11 refers to the data of the distance measurement information 35 on the memory, and updates display of the region mark via the display unit 18.

In step S1761, the control unit 11 starts function guidance based on the identified distance. In step S1762, the control unit 11 refers to the operation control table 310. In step S1770, if the screen recommended in the current identified distance is different from the current display screen, the control unit 11 advances to step S1771. If the display screen is not different, the control unit 11 advances to step S1780.

In step S1771, the control unit 11 switches the screen to the recommended display screen via the display unit 18. For example, if the terminal and the MFP are close to each other, the [scan] button 51 is displayed on the terminal to guide the user to the pull scanning mode 47. If the terminal and the MFP are apart from each other, the [scan] button 51 is not displayed on the terminal, and the user is guided to the push scanning mode 48.

In step S1780, if a job execution instruction is received, the control unit 11 advances to step S1781. If a job execution instruction is not received, the control unit 11 returns to step S1760.

In step S1781, a job with the MFP 2 is started. In step S1782, since the [scan] button 51 is pressed, the control unit 11 applies for and starts a job to the function service 23 of the MFP via the communication unit 19. In step S1784, the control unit 11 accepts and starts a job from the function service 23 of the MFP 2 via the communication unit 19.

In step S1790, the control unit 11 starts job execution and control by the identified distance. In step S117, the control unit 11 executes scanning processing. Details of the scanning processing will be described later with reference to FIGS. 18A and 18B. In step S1791, the control unit 11 switches the screen during the job via the display unit 18. In step S1792, the control unit 11 ends the job with the MFP 2.

Figure 18A:
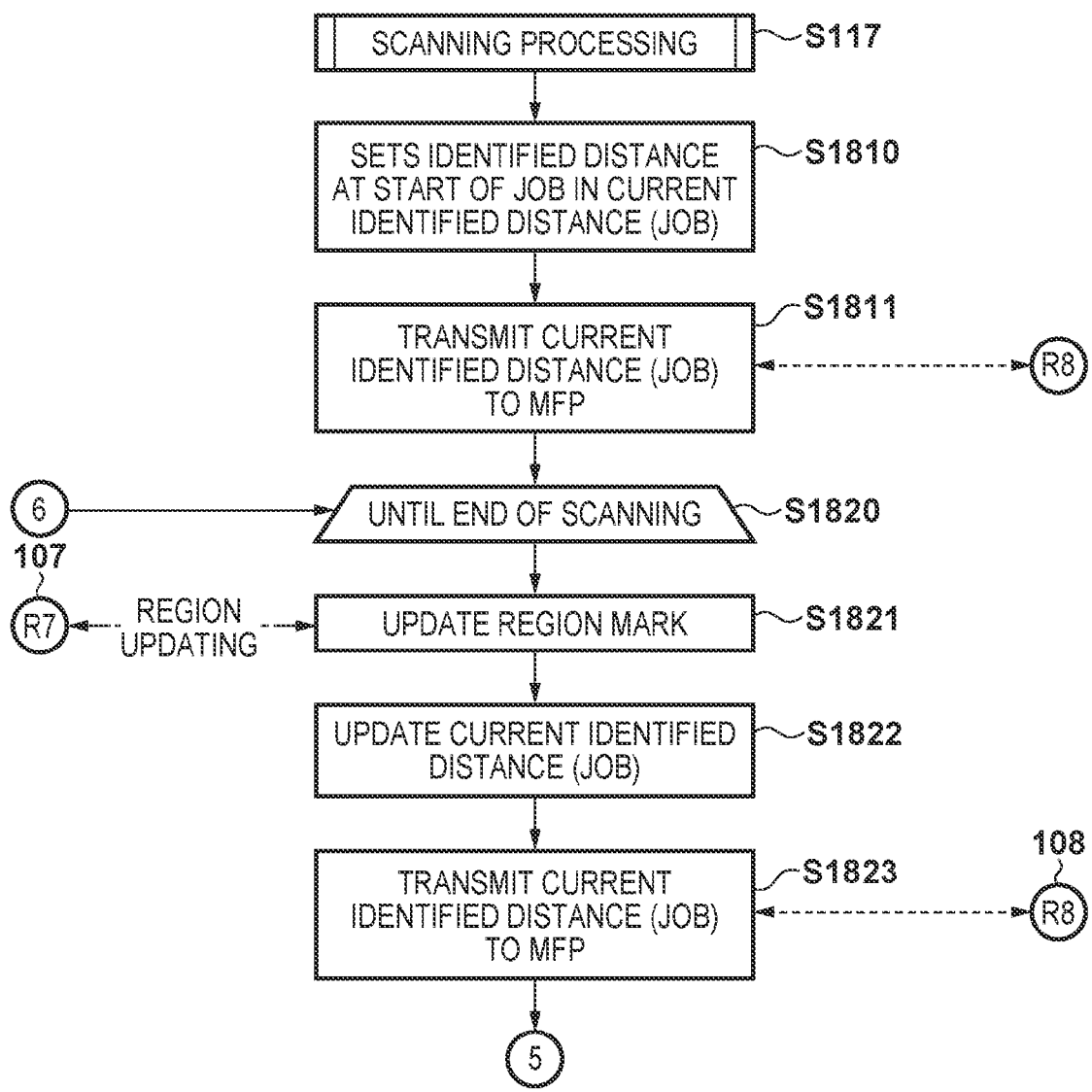
FIGS. 18A and 18B are flowcharts showing details of scanning processing.
Figure 18B:
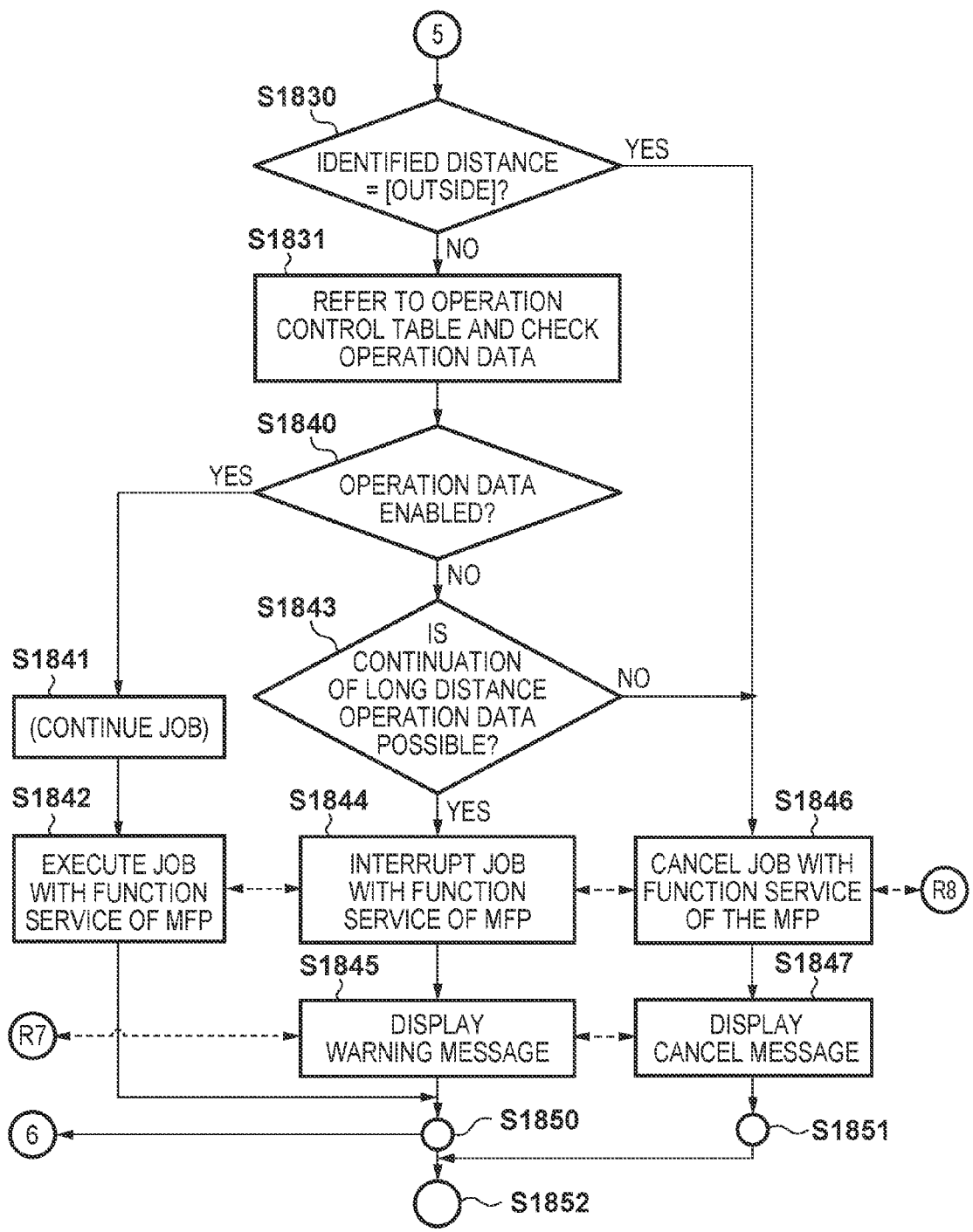

FIGS. 18A and 18B are flowcharts showing details of scanning processing. In this process, the application 10 is executed by the control unit 11 of the mobile terminal 1. The control unit 11 of the mobile terminal 1 controls execution, interrupt, and cancel of a job together with the function service 23 of the MFP 2 in accordance with the identified distance.

In step S1810, the control unit 11 sets the identified distance at the start of the job in the current identified distance (job) 311 on the memory. In step S1811, the control unit 11 transmits the current identified distance (job) 311 to the function service 23 of the MFP 2 via the communication unit 19.

In step S1820, the control unit 11 starts the loop until the end of scanning. In step S1821, the control unit 11 updates the region mark. In step S1822, the control unit 11 updates the current identified distance (job) 311 on the memory. In step S1823, the control unit 11 transmits the current identified distance (job) 311 to the function service 23 of the MFP 2 via the communication unit 19.

In step S1830, if the current identified distance (job) 311 on the memory is [outside], the control unit 11 advances to step S1846. If the current identified distance (job) 311 is not [outside], the control unit 11 advances to step S1831. In step S1831, the control unit 11 refers to the operation control table 310 on the memory.

In step S1840, if operation data corresponding to the identified distance of the current identified distance (job) 311 on the memory is enabled, the control unit 11 advances to step S1841. If operation data is not enabled, the control unit 11 advances to step S1843. In step S1841, the control unit 11 determines to continue the job. In step S1842, the control unit 11 controls job execution together with the function service 23 of the MFP 2 via the communication unit 19.

In step S1843, if continuation of the long distance operation 312 on the memory is possible, the control unit 11 advances to step S1844. If continuation is not possible, the control unit 11 advances to step S1845. In step S1844, the control unit 11 controls job interrupt together with the function service 23 of the MFP 2 via the communication unit 19. In step S1845, the control unit 11 displays the warning message 1080 via the display unit 18.

On the other hand, in step S1846, the control unit 11 controls job cancel together with the function service 23 of the MFP 2 via the communication unit 19. In step S1847, the control unit 11 displays the cancel message 1090 via the display unit 18.

<Flowchart of Process 101 (R1)>

Figure 19:
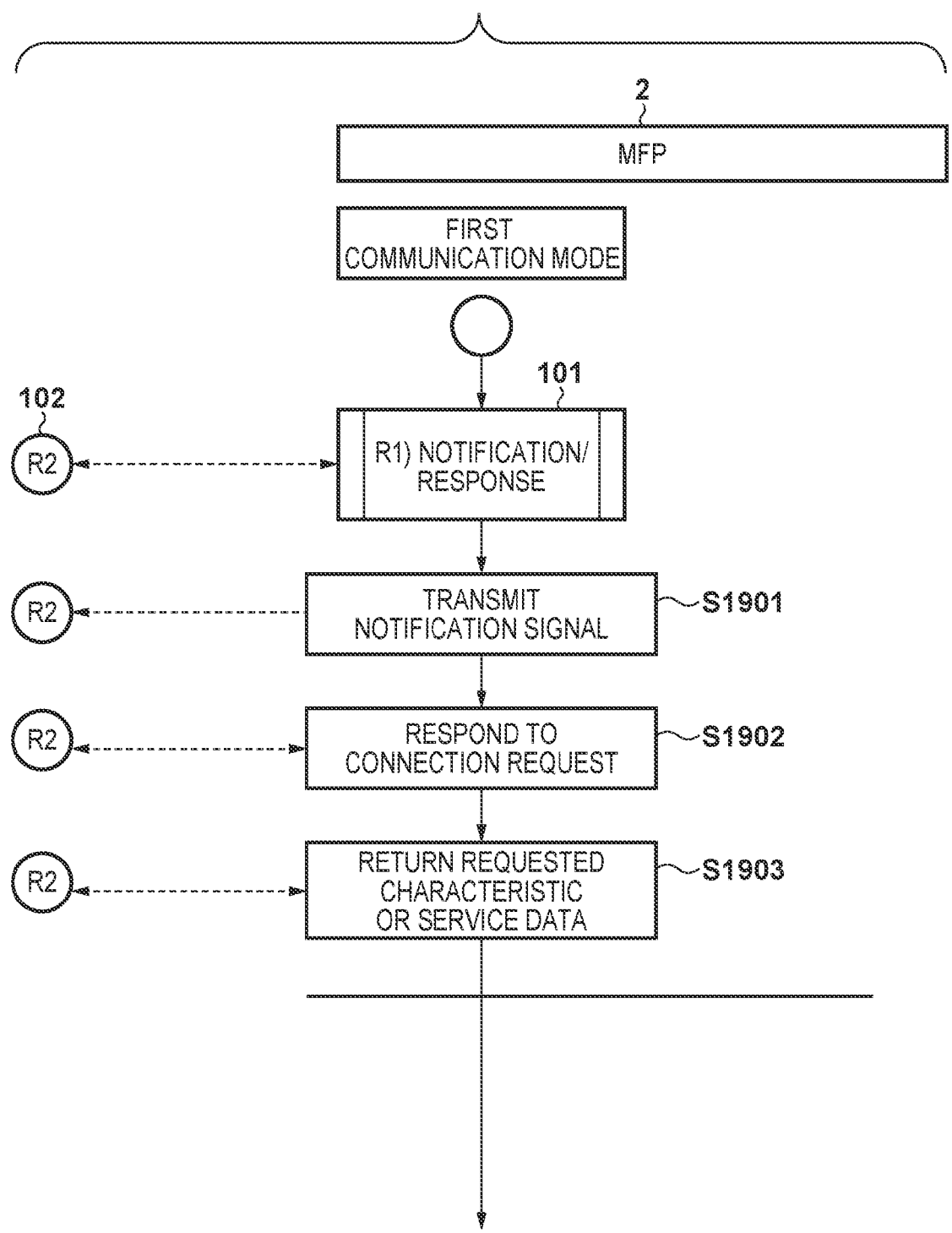
FIG. 19 is a flowchart of a process (R1) in the MFP.

FIG. 19 is a flowchart of the process (R1) in the MFP. The control unit 20 transmits the notification signal 40 via the communication unit 29. The control unit 20 also responds to a connection request from the mobile terminal 1.

In step S1901, the control unit 20 transmits the notification signal 40 via the communication unit 29. The notification signal 40 includes the notification information 30 as the contents. Although this process is expressed as a step in the flowchart for the descriptive convenience, transmission of the notification signal continues.

In step S1902, the control unit 20 responds to a connection request from the mobile terminal 1 via the communication unit 29. In step S1903, the control unit 20 returns a characteristic, service data, or the MFP model information 31 requested by the mobile terminal 1 via the communication unit 29.

<Flowchart of Processes 105 (R5) and 108 (R8)>

Figure 20A:
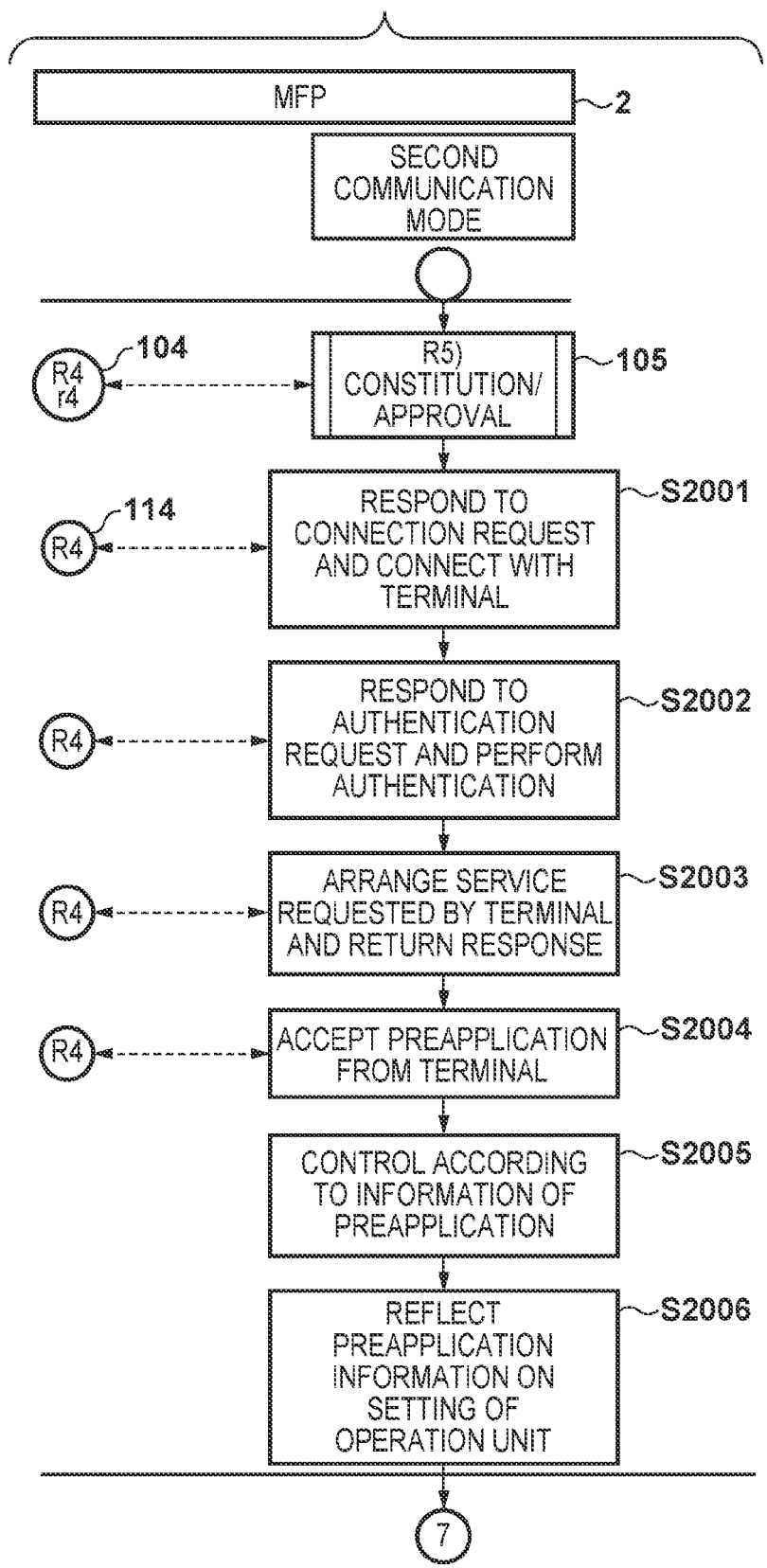
FIGS. 20A and 20B are flowcharts of processes (R5) and (R8) in the MFP.
Figure 20B:
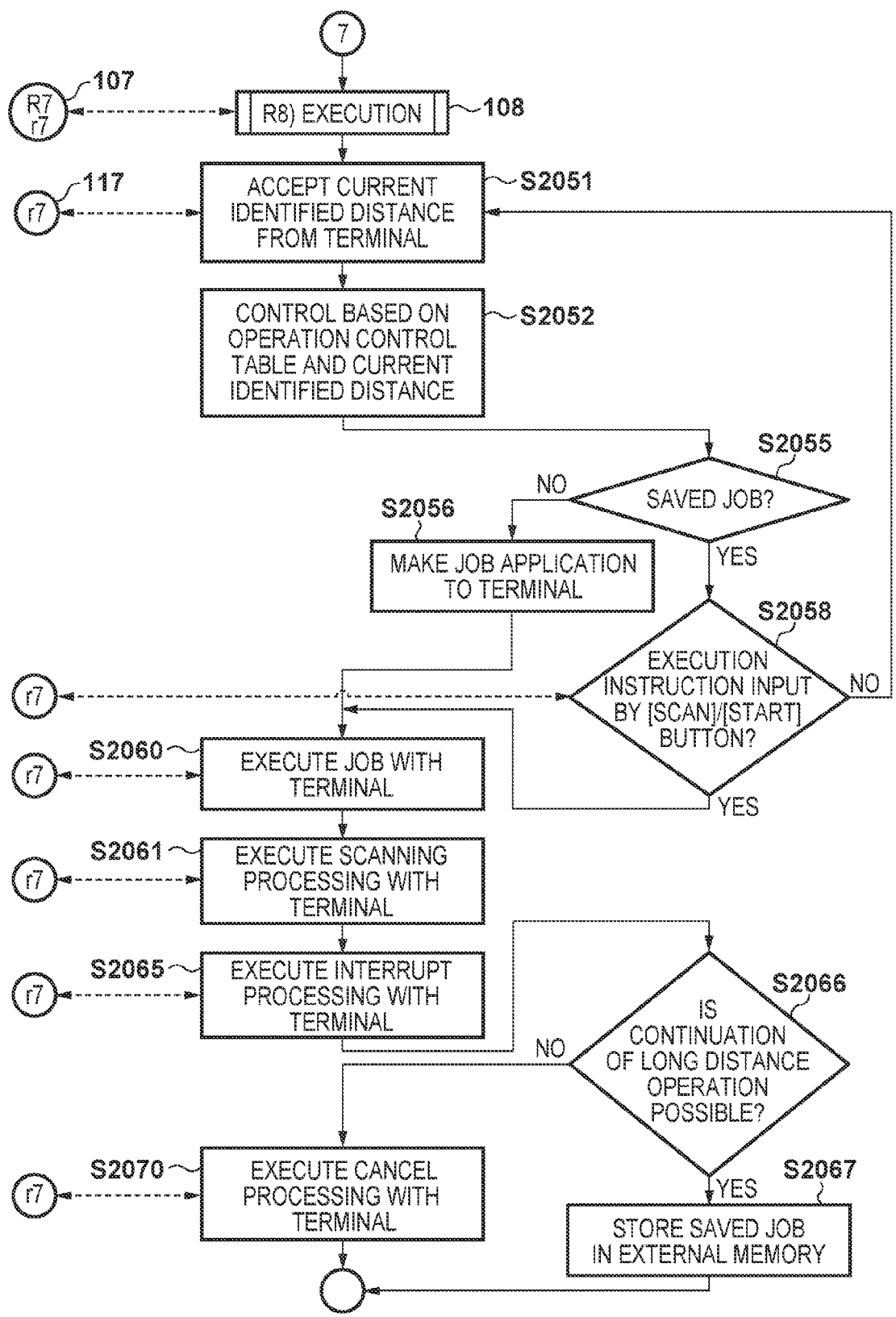

FIGS. 20A and 20B are flowcharts of the processes (R5) and (R8) in the MFP. The control unit 20 approves the request from the mobile terminal 1 via the communication unit 29, arranges the service 21, and accepts the preapplication. The control unit 20 then receives a request from the mobile terminal 1 via the communication unit 29, and causes the arranged service 21 to execute the request and return a response.

In step S2001, the control unit 20 responds to a connection request from the mobile terminal 1 via the communication unit 29 and connects with the terminal. In step S2002, the control unit 20 causes the authentication service 22 to accept an authentication request from the mobile terminal 1 via the communication unit 29 and return a response. In step S2003, the control unit 20 arranges the service 21 requested by the mobile terminal 1 via the communication unit 29 and returns a response.

In step S2004, the control unit 20 causes the function service 23 to accept a preapplication from the mobile terminal 1 via the communication unit 29 and return a response. In step S2005, the control unit 20 performs control according to the information of the preapplication from the mobile terminal 1. In step S2006, the control unit 20 transfers the preapplication information accepted by the function service 23 to the UI service 25, and reflects it on the setting of the operation unit.

In step S2051, the control unit 20 accepts the current identified distance 311 from the mobile terminal 1 via the communication unit 29. In step S2052, the control unit 20 performs control based on the operation control table 310 of the preapplication and the current identified distance 311. Note that the control unit 20 may cause the UI service 25 of the MFP 2 to respond and display the UI of the MFP 2 via the display unit 18 of the mobile terminal 1.

In step S2055, if the saved job 360 exists, the control unit 20 advances to step S2056. If the saved job 360 does not exist, the control unit 20 advances to step S2058. In step S2056, the control unit 20 makes a job application of the saved job 360 to the mobile terminal 1. On the other hand, in step S2058, if an execution instruction is input by pressing the [scan] button 51 or the [start] button 71, the control unit 20 advances to step S2060. If an execution instruction is not input, the control unit 20 returns to step S2051.

In step S2060, the control unit 20 causes the function service 23 to execute the job with the mobile terminal 1 via the communication unit 29 and return a response. In step S2061, the control unit 20 causes the function service 23 to execute processing (push scanning or pull scanning) with the mobile terminal 1 via the communication unit 29 and return a response. In step S2065, the control unit 20 causes the function service 23 to execute interrupt processing with the mobile terminal 1 via the communication unit 29 and return a response.

In step S2066, if continuation of the long distance operation 312 is possible, the control unit 20 advances to step S2067. If continuation is not possible, the control unit 20 advances to step S2070. In step S2067, the control unit 20 stores the saved job 360 in the external memory 163 via the external memory I/F 147. On the other hand, in step S2070, the control unit 20 causes the function service 23 to execute cancel processing with the mobile terminal 1 via the communication unit 29 and return a response.

As described above, according to the first embodiment, based on the notification signal transmitted from the MFP 2, the mobile terminal 1 detects the distance from the MFP 2 and notifies the MFP 2 of it. The MFP 2 decides the operation in accordance with the detected distance.

More specifically, if the distance is short, an operation of guiding the user to pull scanning by a mobile terminal operation is performed. If the distance is long, an operation of guiding the user to push scanning by an MFP operation is performed. When such an operation is performed, the user convenience is improved when using the system cooperation function such as the scanning function. For example, the user can easily determine which device has the operation unit to be operated when using the system cooperation function.

(Other Embodiments)

In the embodiment of the present invention, a characteristic arrangement has been described by exemplifying an MFP. However, the present invention is applicable not only to the MFP but also to any system in which a mobile terminal and a device cooperate. Examples are a printer, a FAX apparatus, and a moving image reproduction apparatus. The present invention is applicable to a form that makes the devices cooperatively perform application, instruction, and extraction of a job and a screen display form at that time. The present invention is also applicable even if the processing relationship between the mobile terminal and the device is reversed. The present invention is also applicable even if the display relationship between the mobile terminal and the device is reversed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-081228, filed Apr. 10, 2015, which is hereby incorporated by reference herein in its entirety.

What is claimed is:

1. An information processing system including an image processing apparatus with an image scanning unit and a mobile terminal, wherein the mobile terminal comprises:
   a wireless communication unit configured to perform wireless communication;
   a memory storing instructions; and
   a processor that can execute the instructions, causing the mobile terminal to:
   identify a distance from the image processing apparatus based on wireless communication with the image processing apparatus by the wireless communication unit;
   display a first screen that prompts a first scanning method if the identified distance is less than a predetermined first distance;

display the first screen or a second screen corresponding to a second scanning method different from the first scanning method if the identified distance is not less than the first distance and the identified distance is less than a predetermined second distance;

control, based on a user operation accepted via the first screen, an image scanning operation by the image scanning unit in cooperation with the image processing apparatus; and display not the first screen but the second screen if the identified distance is not less than the second distance.

2. The system according to claim 1, wherein the first scanning method is pull scanning in which the image scanning unit is controlled by a user operation for the mobile terminal, and the second scanning method is push scanning in which the image scanning unit is controlled by a user operation for the image processing apparatus.

3. The system according to claim 2, wherein if the first screen that prompts the pull scanning is displayed, but the user operation is performed for the image processing apparatus, the image scanning operation based on the push scanning is executed.

4. The system according to claim 1, wherein the image scanning operation by the image scanning unit is stopped if the wireless communication with the image processing apparatus by the wireless communication unit is disabled during control of the image scanning operation.

5. The system according to claim 4, wherein the image scanning operation is resumed if the wireless communication with the image processing apparatus by the wireless communication unit is enabled again after the stop of the image scanning operation.

6. The system according to claim 1, wherein the image processing apparatus transmits a notification signal, and wherein the mobile terminal identifies the distance based on the notification signal received via the wireless communication unit.

7. The system according to claim 1, wherein the wireless communication unit performs communication complying with a Bluetooth communication standard, and wherein the mobile terminal identifies the distance based on the wireless communication in an LE (Low Energy) mode by the wireless communication unit.

8. The system according to claim 7, wherein an image scanned by the image scanning unit is received based on the wireless communication in a normal mode by the wireless communication unit.

9. A mobile terminal that controls an image processing apparatus with an image scanning unit via wireless communication, comprising:

a memory storing instructions; and a processor that can execute the instructions, causing the mobile terminal to:

identify a distance from the image processing apparatus based on wireless communication with the image processing apparatus;

display a first screen that prompts a first scanning method if the identified distance is less than a predetermined first distance;

display the first screen or a second screen corresponding to a second scanning method different from the first scanning method if the identified distance is not less than the first distance and the identified distance is less than a predetermined second distance;

control, based on a user operation accepted via the first screen, an image scanning operation by the image scanning unit in cooperation with the image processing apparatus; and display not the first screen but the second screen if the identified distance is not less than the second distance.

10. A method of controlling a mobile terminal that controls an image processing apparatus with an image scanning unit via wireless communication, comprising:

identifying a distance from the image processing apparatus based on wireless communication with the image processing apparatus;

displaying a first screen that prompts a first scanning method if the identified distance is less than a predetermined first distance;

displaying the first screen or a second screen corresponding to a second scanning method different from the first scanning method if the identified distance is not less than the first distance and the identified distance is less than a predetermined second distance;

controlling, based on a user operation accepted via the first screen, an image scanning operation by the image scanning unit in cooperation with the image processing apparatus; and displaying not the first screen but the second screen if the identified distance is not less than the second distance.

11. A non-transitory computer-readable recording medium storing a program that causes execution of a control method of an image processing apparatus with an image scanning unit via wireless communication, the method comprising:

identifying a distance from the image processing apparatus based on wireless communication with the image processing apparatus;

displaying a first screen that prompts a first scanning method if the identified distance is less than a predetermined first distance;

displaying the first screen or a second screen corresponding to a second scanning method different from the first scanning method if the identified distance is not less than the first distance and the identified distance is less than a predetermined second distance;

controlling, based on a user operation accepted via the first screen, an image scanning operation by the image scanning unit in cooperation with the image processing apparatus; and displaying not the first screen but the second screen if the identified distance is not less than the second distance.

* * * * *